United States Patent
Yanai

(10) Patent No.: US 8,699,066 B2
(45) Date of Patent: Apr. 15, 2014

(54) DATA PROCESSING APPARATUS, DATA PROCESSING METHOD, AND STORAGE MEDIUM CAPABLE OF SUPPRESSING AN INCREASE IN PROCESSING LOAD IN DETERMINATION OF A COLOR RANGE

(75) Inventor: Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 13/190,274

(22) Filed: Jul. 25, 2011

(65) Prior Publication Data

US 2012/0026544 A1   Feb. 2, 2012

(30) Foreign Application Priority Data

Jul. 27, 2010   (JP) ................. 2010-168540

(51) Int. Cl.
*G06F 3/12* (2006.01)
*G06K 15/00* (2006.01)

(52) U.S. Cl.
USPC .......................................... 358/1.15; 358/1.9

(58) Field of Classification Search
USPC ............... 358/1.9, 3.2, 3.03, 3.06, 3.09, 3.26, 358/1.15, 533, 536; 382/260, 266
See application file for complete search history.

(56) References Cited

U.S. PATENT DOCUMENTS

| | | | |
|---|---|---|---|
| 6,252,675 B1 | 6/2001 | Jacobs | |
| 7,515,303 B2 * | 4/2009 | Hansen et al. | 358/3.13 |
| 8,355,189 B2 * | 1/2013 | Shacham et al. | 358/533 |
| 8,432,582 B2 * | 4/2013 | Zhang et al. | 358/3.09 |
| 8,472,081 B2 * | 6/2013 | Shacham et al. | 358/3.06 |
| 2005/0243376 A1 | 11/2005 | Kim | |
| 2006/0077489 A1 | 4/2006 | Zhang | |

FOREIGN PATENT DOCUMENTS

| | | |
|---|---|---|
| CN | 101175131 A | 5/2008 |
| EP | 1501277 A1 | 1/2005 |
| JP | 2000-032266 A | 1/2000 |
| JP | 2004-040499 A | 2/2004 |
| JP | 2006-174068 A | 6/2006 |
| JP | 2010-074627 A | 4/2010 |

* cited by examiner

*Primary Examiner* — Gabriel Garcia
(74) *Attorney, Agent, or Firm* — Canon U.S.A., Inc., IP Division

(57) ABSTRACT

A high-quality image reproducibility is realized by appropriately evaluating a screen processing result and controlling the screen processing. An image processing apparatus includes a first screen processing unit for performing screen processing on input image data using first screen information, an evaluation unit for acquiring an evaluation value of a processing result of the first screen processing unit based on a difference between a low-frequency component of the processing result of the first screen processing unit and a low-frequency component of the input image data, a setting unit for setting screen information acquired by performing calculation using the first screen information and second screen information that is different from the first screen information, according to an evaluation value of a processing result of the first screen processing unit, and a second screen processing unit for performing screen processing on the input image data using the set screen information.

13 Claims, 30 Drawing Sheets

IMAGE DATA
D_c

LINE SCREEN PROCESSING (1)
L_Th_c (1)

LINE SCREEN PROCESSING (1)
BINARY DATA
Out_L_c (1)

LINE SCREEN PROCESSING (2)
L_Th_c (2)

LINE SCREEN PROCESSING (2)
BINARY DATA
Out_L_c (2)

FREQUENCY CHARACTERISTIC
OF BASIC SCREEN AND CUTOFF
FREQUENCY OF FIRST LPF

FREQUENCY CHARACTERISTIC
OF LINE SCREEN 1 AND CUTOFF
FREQUENCY OF SECOND LPF

FREQUENCY CHARACTERISTIC
OF LINE SCREEN 2 AND CUTOFF
FREQUENCY OF THIRD LPF

FIG.7

| | | Ba_SC_Abs 515 | | | | | | |
|---|---|---|---|---|---|---|---|---|
| | | 0.5 | 1 | 3 | 5 | 10 | 50 | 100 |
| L_SC_Abs | 0.5 | 1.0 | 1.0 | 1.0 | 0.5 | 0.0 | 0.0 | 0.0 |
| | 1 | 1.0 | 1.0 | 1.0 | 0.5 | 0.0 | 0.0 | 0.0 |
| | 3 | 1.0 | 1.0 | 1.0 | 0.5 | 0.0 | 0.0 | 0.0 |
| | 5 | 1.0 | 1.0 | 1.0 | 0.5 | 0.0 | 0.0 | 0.0 |
| | 10 | 1.0 | 1.0 | 1.0 | 0.5 | 0.0 | 0.0 | 0.0 |
| | 50 | 1.0 | 1.0 | 1.0 | 0.5 | 0.0 | 0.0 | 0.0 |
| | 100 | 1.0 | 1.0 | 1.0 | 0.5 | 0.0 | 0.0 | 0.0 |

NUMBERS INDICATE VALUES OF W_Ba (W_L = 1 - W_Ba)

|  |  | Ba_SC_Abs | | | | | | |
|---|---|---|---|---|---|---|---|---|
|  |  | 0.5 | 1 | 3 | 5 | 10 | 50 | 100 |
| L_SC_Abs | 0.5 | 1.0 | 1.0 | 1.0 | 0.5 | 0.0 | 0.0 | 0.0 |
|  | 1 | 1.0 | 1.0 | 1.0 | 0.5 | 0.0 | 0.0 | 0.0 |
|  | 3 | 1.0 | 1.0 | 1.0 | 0.5 | 0.0 | 0.0 | 0.0 |
|  | 5 | 1.0 | 1.0 | 1.0 | 1.0 | 0.5 | 0.0 | 0.0 |
|  | 10 | 1.0 | 1.0 | 1.0 | 1.0 | 1.0 | 0.5 | 0.0 |
|  | 50 | 1.0 | 1.0 | 1.0 | 1.0 | 1.0 | 1.0 | 0.5 |
|  | 100 | 1.0 | 1.0 | 1.0 | 1.0 | 1.0 | 1.0 | 1.0 |

NUMBERS INDICATE VALUES OF W_Ba (W_L = 1 - W_Ba)

FIG.20

| | 2001 | 2002 | 2003 | 2004 | 2005 |
|---|---|---|---|---|---|
| | $W\_Ba = 1$ | $0.5 < W\_Ba < 1$ | $W\_Ba = 0.5$ | $0 < W\_Ba < 0.5$ | $W\_Ba = 0$ |
| Ba_Th_c vs T_B | linear decreasing from 1.0 | linear decreasing from 1.0 | linear decreasing from 1.0 | linear decreasing | vertical line at T_B=1.0 |
| L_Th_c vs T_L | vertical line at T_L=1.0 | steep decreasing | linear decreasing from 1.0 | linear decreasing from 1.0 | linear decreasing from 1.0 |
| gains | $g\_B = 0.5$<br>$g\_L = 1.0$<br>$g\_t = 1.0$ | $g\_B = 0.5$<br>$g\_L = W\_Ba$<br>$g\_t = 1.0/W\_Ba$ | $g\_B = 0.5$<br>$g\_L = 0.5$<br>$g\_t = 2.0$ | $g\_B = 1.0 - W\_Ba$<br>$g\_L = 0.5$<br>$g\_t = 1.0/(1.0 - W\_Ba)$ | $g\_B = 1.0$<br>$g\_L = 0.5$<br>$g\_t = 1.0$ |

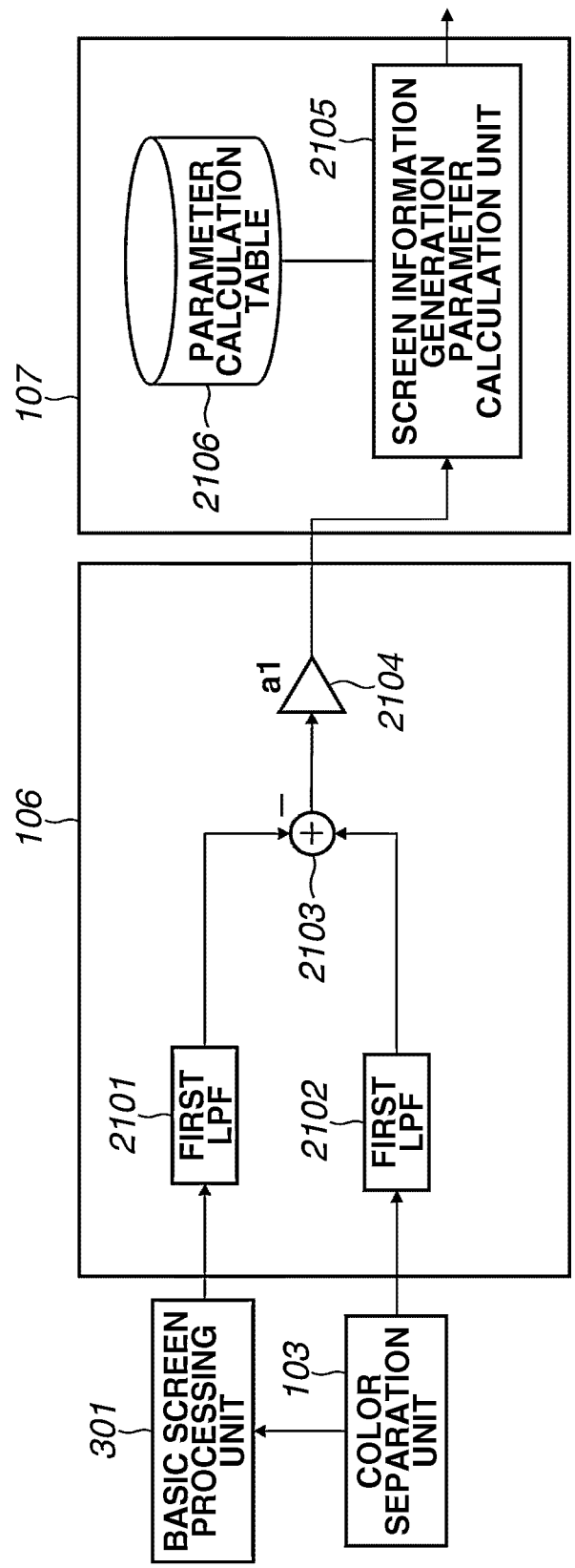

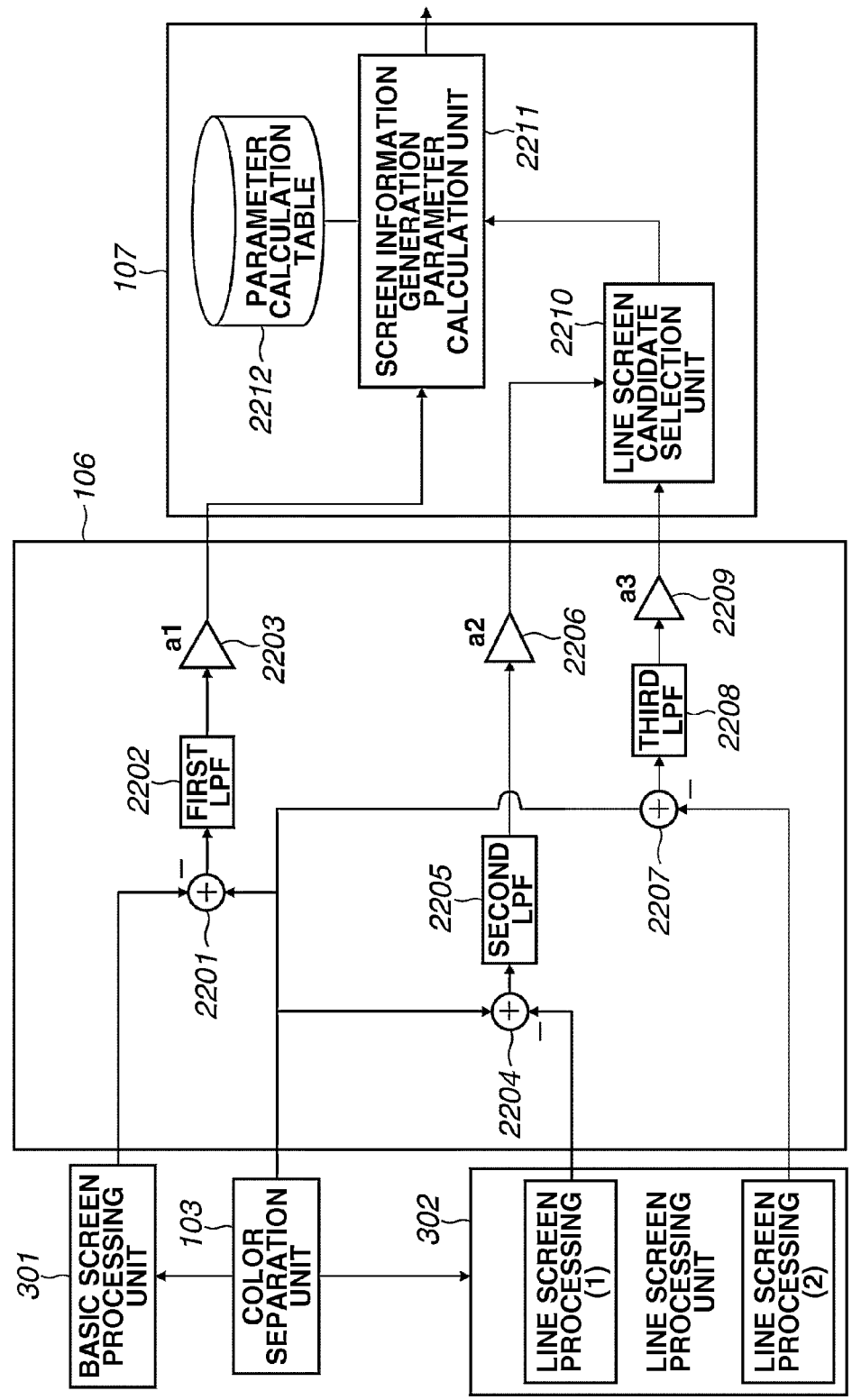

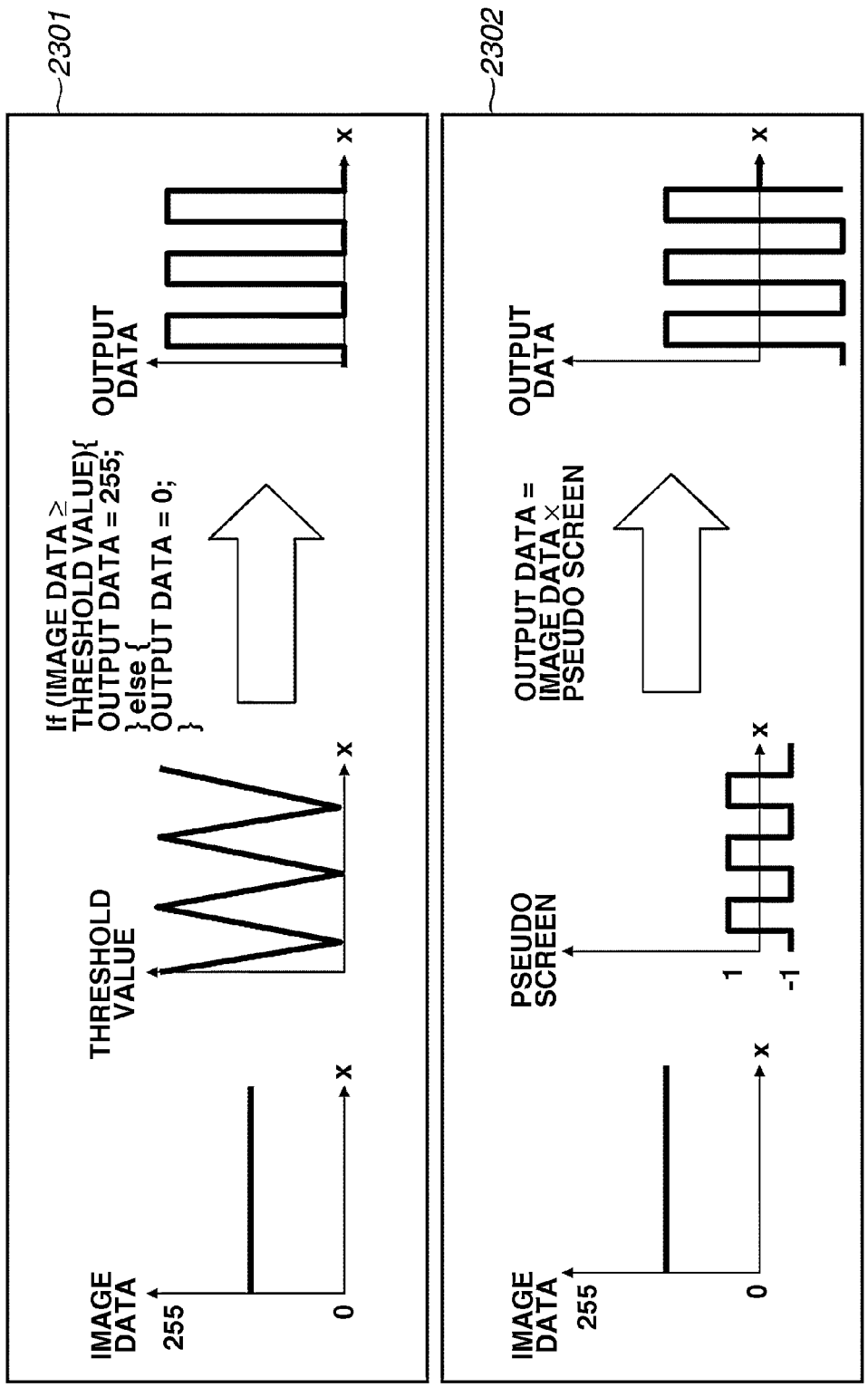

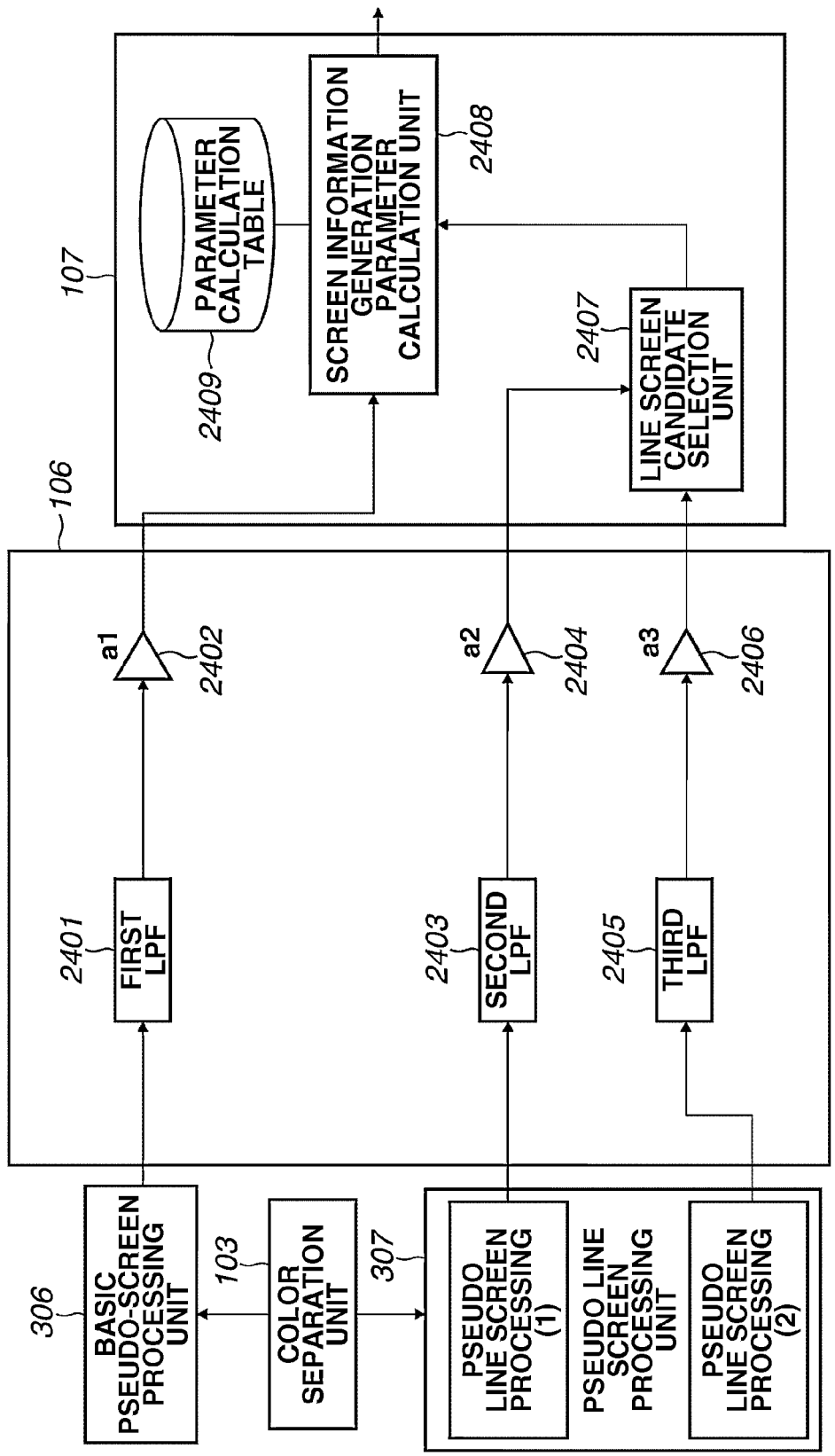

DATA PROCESSING APPARATUS, DATA PROCESSING METHOD, AND STORAGE MEDIUM CAPABLE OF SUPPRESSING AN INCREASE IN PROCESSING LOAD IN DETERMINATION OF A COLOR RANGE

BACKGROUND OF THE INVENTION

1. Field of the Invention

The present invention relates to a technique for performing screen processing.

2. Description of the Related Art

In the field of printing, gradation is expressed by performing screen processing on input data and controlling on and off of dots according to the screen processing result.

When screen processing is performed on the input data, the input data is quantized using a threshold value group (hereinbelow referred to as a screen) in which large and small threshold values are periodically disposed. More specifically, the input data of a target pixel is compared with a screen threshold value corresponding to the target pixel. If the input data is greater, the dot becomes on, and if the input data is smaller, the dot becomes off. For example, there is an amplitude modulation (AM) screen processing technique in which the threshold values are periodically disposed according to setline per inch and inclination angle (i.e., a screen angle), which are properties of the screen used.

However, if the input image includes thin lines or an edge, the image and the screen interfere with each other in a case where the direction of the thin line or the edge is close to the inclination angle. As a result, the lines may be broken, the jaggy may be generated at the edge, or moiré may be generated. Japanese Patent Application Laid-Open No. 2004-040499 discusses a technique which extracts a contour region in graphic data and switches the screen.

Further, Japanese Patent Application Laid-Open No. 2010-074627 discusses a technique which combines a plurality of screens whose screen angles are the same and whose numbers of lines are integral multiples, according to a characteristics amount of the edge or the thin lines in the input image.

Furthermore, Japanese Patent Application Laid-Open No. 2006-174068 discusses a technique which increases reproducibility of the thin lines or the edge without determining and detecting the thin lines or the edge. More specifically, a plurality of screens of different screen angles is prepared, and screen-processed data is generated for each pixel block of a predetermined size. An error between each of the screen-processed data and the input image is then evaluated for each pixel block, and screen processing in which the error is smallest is selected.

However, according to the above-described techniques, there are problems as follows. It is necessary in methods discussed in Japanese Patent Application Laid-Open No. 2004-040499 and Japanese Patent Application Laid-Open No. 2010-074627 to determine whether the image includes the thin lines or the edge. If there is an error in such determination, appropriate processing cannot be performed. Further, since the screen angles of the plurality of screens are the same in the method discussed in Japanese Patent Application Laid-Open No. 2010-074627, the thin lines may be broken and jaggy may be generated at the edge.

Furthermore, according to the technique discussed in Japanese Patent Application Laid-Open No. 2006-174068, screen processing is evaluated using a density error in a predetermined block. As a result, breaking of the thin lines, a jaggy edge, and a moiré generated due to interference cannot be correctly evaluated, so that screen processing having high reproducibility cannot be performed.

SUMMARY OF THE INVENTION

The present invention is directed to an image processing apparatus and an image processing method capable of detecting a screen processing result with high accuracy and realizing screen processing having high reproducibility.

According to an aspect of the present invention, an image processing apparatus includes a first screen processing unit configured to perform screen processing on input image data using first screen information, an evaluation unit configured to acquire an evaluation value of a processing result of the first screen processing unit based on a difference between a low-frequency component of the processing result of the first screen processing unit and a low-frequency component of the input image data, a setting unit configured to set screen information acquired by performing calculation using the first screen information and second screen information that is different from the first screen information, according to an evaluation value of a processing result of the first screen processing unit, and a second screen processing unit configured to perform screen processing on the input image data using the set screen information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

Figure 4B:
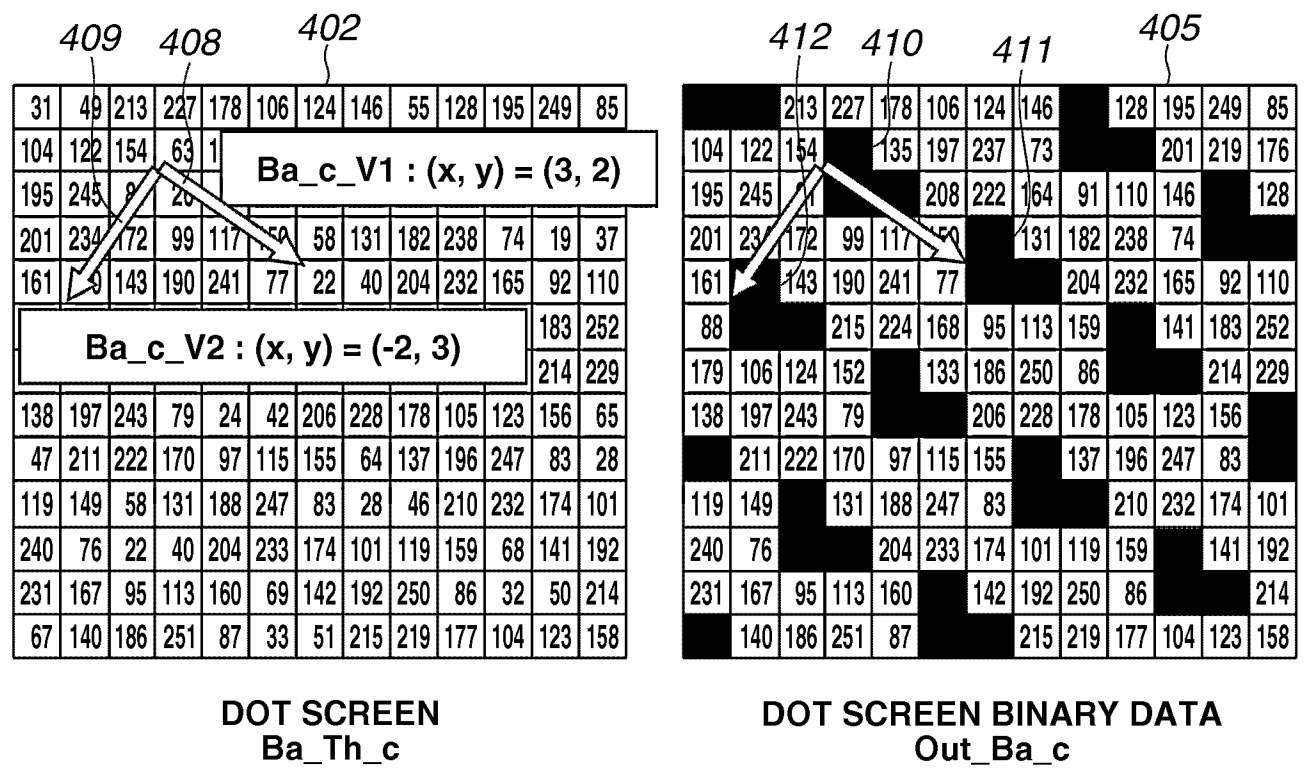

FIGS. 4A to 4D are schematic diagrams illustrating dot screen processing and line screen processing.

FIG. 7 illustrates a parameter calculation table.

FIGS. 13A to 13C illustrate line screen processing.

FIG. 18 illustrates a modified example of the parameter calculation table.

FIG. 20 illustrates an operation of the combination screen information calculation unit when screen processing is combined by performing multiplication.

FIG. 21 illustrates an example of evaluating only the basic screen processing result.

FIG. 22 illustrates an operation of the evaluation value calculation unit when the number of low-pass filters (LPF) has been reduced.

FIG. 23 illustrates pseudo-screen processing.

FIG. 24 illustrates an operation of the evaluation value calculation unit using the pseudo-screen processing when the number of LPF has been reduced.

DESCRIPTION OF THE EMBODIMENTS

Various exemplary embodiments, features, and aspects of the invention will be described in detail below with reference to the drawings.

Configurations according to exemplary embodiments to be described below are just examples, and the present invention is not limited to illustrated configurations.

Figure 1:
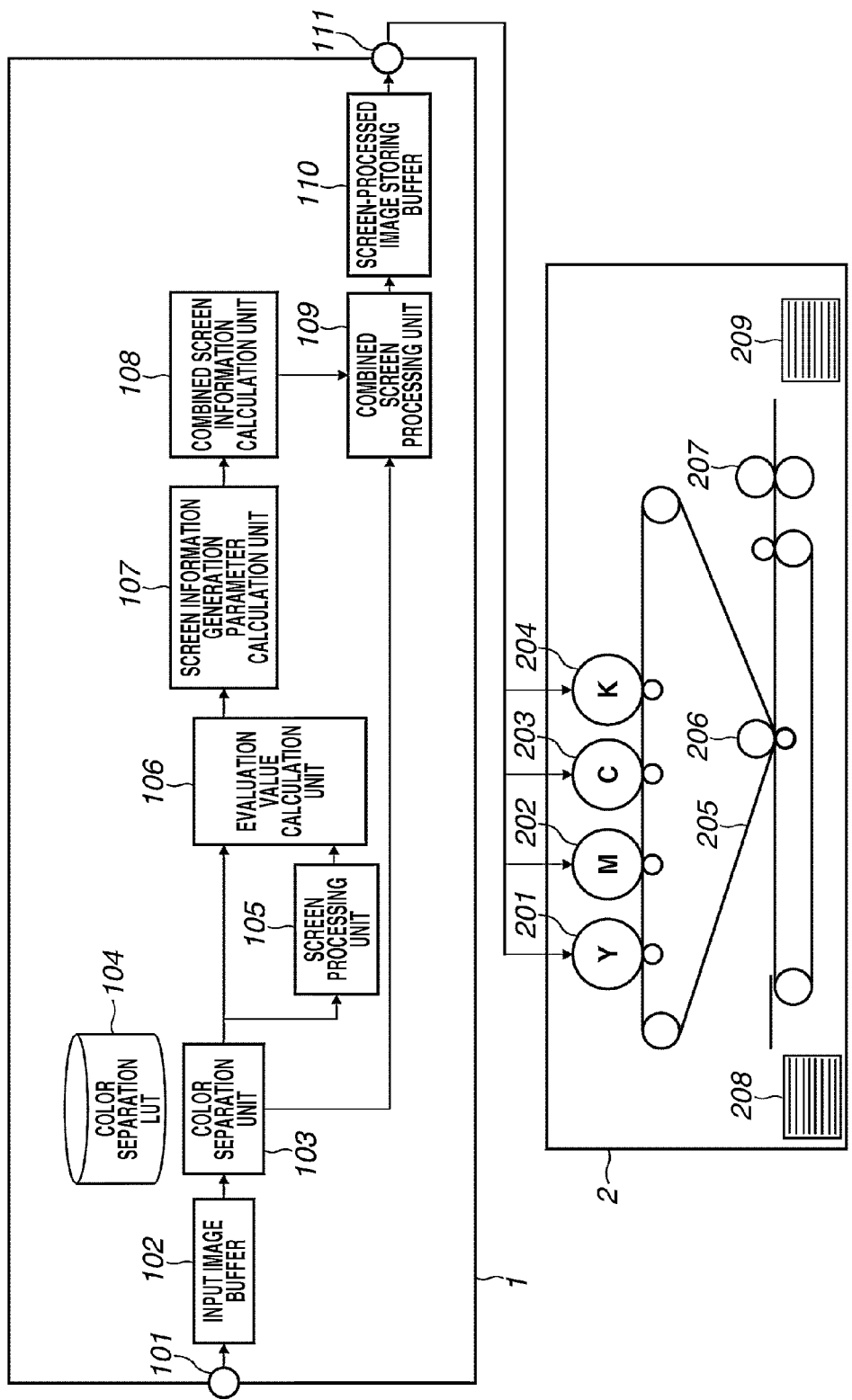
FIG. 1 is a block diagram illustrating a configuration of an image processing apparatus and an image forming apparatus.

FIG. 1 is a block diagram illustrating a configuration of an image processing apparatus and an image forming apparatus according to the present exemplary embodiment. According to the present exemplary embodiment, the image forming apparatus uses an electrophotographic printer. However, the image forming apparatus is not limited to the electrophotographic printer, and may be a printer employing other methods such as an inkjet method, sublimation, or an offset printing method.

Referring to FIG. 1, an image processing apparatus 1 and an image forming apparatus 2 are connected by an interface or a circuit. For example, the image processing apparatus 1 is a driver installed in a common personal computer. In such a case, each component in the image processing apparatus 1 is realized by the computer executing a predetermined program. Further, the image forming apparatus 2 may include the image processing apparatus 1.

The image processing apparatus 1 stores in an input image buffer 102, color input image data of a print object input from an input terminal 101. The color input image data is configured of three color components, i.e., red (R), green (G), and blue (B).

A color separation unit 103 refers to a color separation look-up table (LUT) 104 and separates the stored color input image data to color data corresponding to colors of color materials included in the image forming apparatus 2. According to the present exemplary embodiment, the color materials are of four colors of, i.e., cyan (C), magenta (M), yellow (Y), and black (K). The RGB color input image data is thus converted to the CMYK image data.

A screen processing unit 105 performs screen processing for each plane data of the CMYK image data. The screen processing unit 105 performs a plurality of screen processing to binarize the image data output from the color separation unit 103, and then outputs a plurality of binary data. Each of the plurality of screen processing uses different screen information to binarize the image data.

The screen information is the threshold value group (i.e., screen) in which the threshold values of various values corresponding to each pixel are periodically disposed. When the screen processing unit 105 performs screen processing, the screen processing unit 105 compares the image data of the target pixel with the threshold value corresponding to the target pixel by referring to the screen information. If the image data of the target pixel is greater than the threshold value, the pixel becomes on, and if image data of the target pixel is less than the threshold value, the pixel becomes off. The image data is thus binarized.

An evaluation value calculation unit 106 evaluates the binary data output from the screen processing unit 105. The evaluation value calculation unit 106 compares the low-frequency component of the binary data with the low-frequency component of the image data before screen processing is performed, and calculates the evaluation value. The evaluation value is calculated for each screen processing result.

A screen information generation parameter calculation unit 107 calculates parameters for generating combined screen information based on the evaluation values of the screen processing results acquired from the evaluation value calculation unit 106. A combined screen information calculation unit 108 generates the combined screen information using the parameters calculated by the screen information generation parameter calculation unit 107.

A combined screen processing unit 109 performs screen processing on the image data using the combined screen information. The combined screen processing unit 19 then converts the image data to combined screen binary data, and stores the combined screen binary data in a screen-processed image storing buffer 110. The combined screen binary data is then output from an output terminal 111 to the image forming apparatus 2.

The image forming apparatus 2 includes photosensitive drums 201, 202, 203, and 204, an intermediate transfer belt 205, a transfer unit 206, a fixing unit 207, a sheet tray 208, and a printed product stacking unit 209.

In the image forming apparatus 2, latent images based on the binary data for each of the C, M, Y, and K colors received from the image processing apparatus 1 are formed respectively on the photosensitive drums 201, 202, 203, and 204 corresponding to each of the C, M, Y, and K colors. Toner images are then formed based on the latent images on the photosensitive drums 201, 202, 203, and 204, and the toner images are transferred to the intermediate transfer belt 205 on which a color image is formed.

The transfer unit 206 transfers the color image to a sheet supplied from the sheet tray 208, and the fixing unit 207 fixes the color image on the sheet. The sheet on which the color image is fixed is conveyed to the printed product stacking unit 209.

Figure 3:
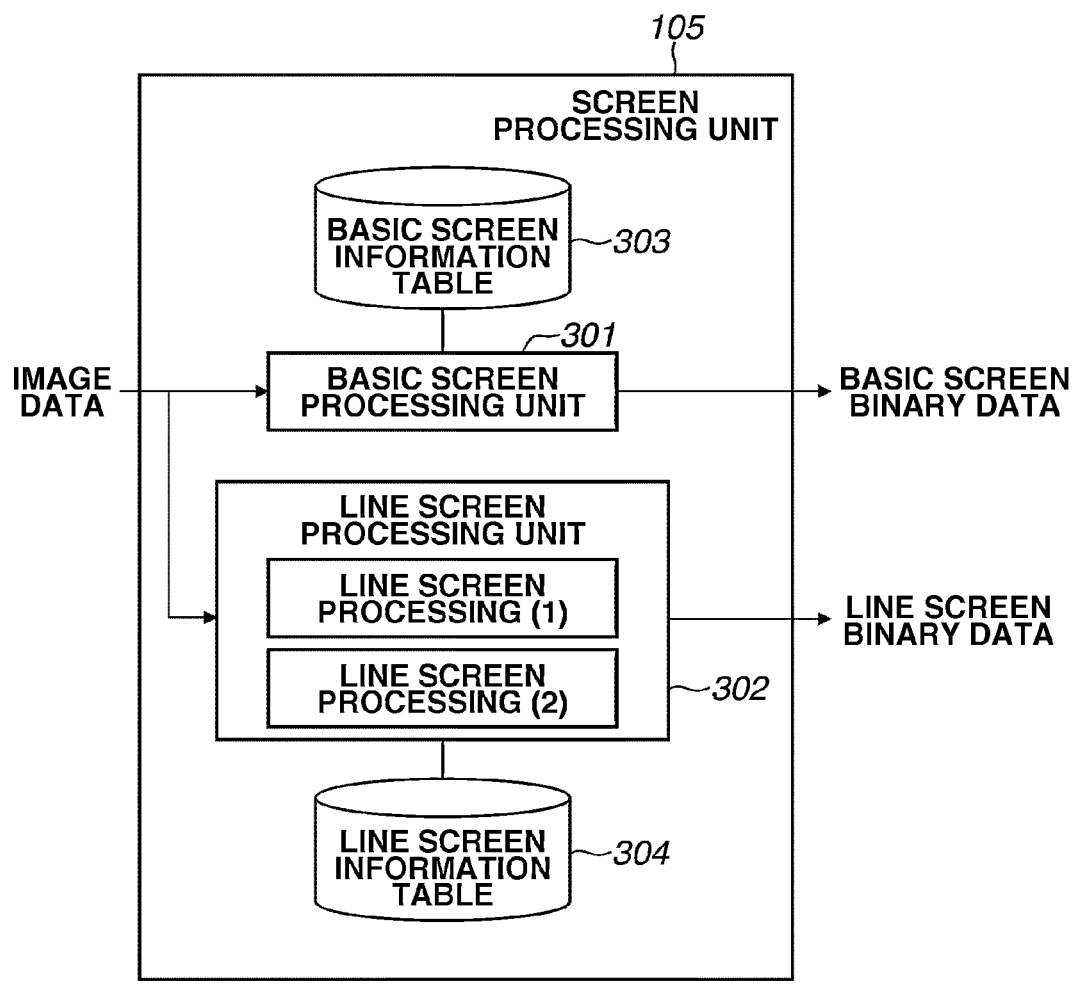
FIG. 3 illustrates a screen processing unit.
Figure 4A:
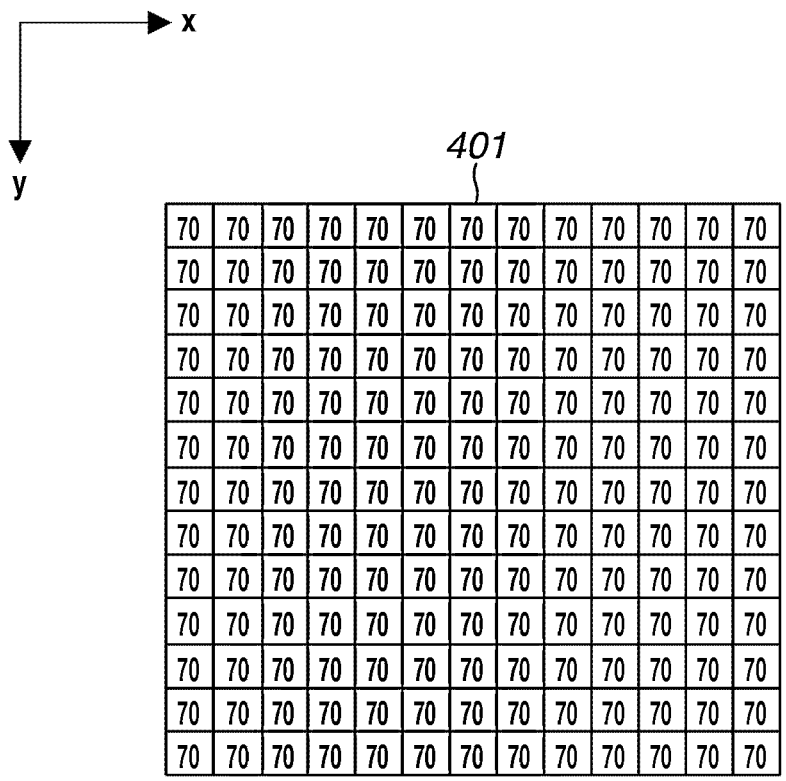

FIG. 3 is a block diagram illustrating a configuration of the screen processing unit 105. Referring to FIG. 3, a basic screen processing unit 301 refers to basic screen information 303 and performs screen processing on the image data. The basic screen processing unit 301 thus converts the image data to basic screen binary data. According to the present exemplary embodiment, the basic screen processing unit 301 performs dot screen processing.

A line screen processing unit 302 includes two line screen information tables 304 with respect to one color. The line screen processing unit 302 refers to the two line screen information tables 304 and performs two types of line screen processing on the image data, and converts the image data to two sets of line screen binary data.

FIGS. 4A to 4D are schematic diagrams illustrating the dot screen processing information used in the basic screen processing unit 301 and two types of the line screen processing information used in the line screen processing unit 302.

Referring to FIGS. 4A to 4D, dot screen information 402 used in the basic screen processing unit 301 is the threshold value group in which the threshold values (from 1 to 255) are arranged corresponding to pixel positions. According to the present exemplary embodiment, the dot screen information 402 is used in the basic screen processing. If the basic screen processing unit 301 performs by referring to the dot screen information 402, screen processing on image data 401 in which all pixel values are 70, dot screen binary data 405 is acquired.

In the dot screen binary data 405, black pixels are the pixels each corresponding to an "on" dot. The dots appear periodically in the dot screen binary data 405, due a periodic pattern in the dither pattern. If a dot 410 corresponding to the top of the L shape in the dot screen binary data 405 is a target pixel, dots 411 and 412 are the closest dots having a corresponding position in the L shaped regions of 'on' pixels.

Vectors in two directions which are acquired by connecting the target dot and the closest dots are screen vectors indicating the characteristics of the dot screen information 402. In the example illustrated in FIG. 4, (x, y)=(3, 2) and (x, y)=(−2, 3) are the screen vectors of the dot screen information 402. As for the screen vector, the direction of the screen vector indicates the screen angle, and the length of the screen vector indicates a line number (resolution).

The length of each screen vector in the dot screen 402 is the same. However, this is not a limitation. The two screen vectors configuring the screen information used in performing basic screen processing unit will be referred to as basic screen vectors. According to the present exemplary embodiment, (x, y)=(3, 2) and (x, y)=(−2, 3) thus become the basic screen vectors.

Line screen information (1) 403 and line screen information (2) 404 are used in screen processing performed in the line screen processing unit 302. If the line screen processing unit 302 performs by referring to the line screen information (1) 403 and the line screen information (2) 404, screen processing on image data 401 in which all pixel values are 70, similarly as the above-described dot screen processing, line screen binary data 406 and 407 are acquired.

The lines appear periodically in the line screen binary data 406 and 407. In other words, the line screen information includes one screen vector in a perpendicular direction with respect to the line. The screen vector of the line screen information (1) 403 thus becomes (x, y)=(3, 2), and the screen vector (2) of the line screen information (2) 404 becomes (x, y)=(−2, 3).

A starting point of the screen vector of each line screen information is the same as the starting point of the two basic screen vectors, which indicates that phases (positions) of the screen vectors are the same. Further, the screen vector of each of the line screen vector information is a linear combination of basic screen vectors 408 and 409, and each combination coefficient is expressed as an integer (including 0 or negative integers) or an inverse of the integer.

When a screen vector indicating a characteristic of the line screen information is $L\_V(k)$ (wherein k is a natural number greater than or equal to 1), and the basic screen vectors are $Ba\_V1$ and $Ba\_V2$, $L\_V(k)$ is expressed by equation (1).

$$L\_V(k) = \alpha \times Ba\_V1 + \beta \times Ba\_V2 \quad (1)$$

($\alpha, \beta$: integer or an inverse of an integer)

A screen vector $L\_V(1)$ of the line screen information (1) 403 and a screen vector $L\_V(2)$ of the line screen information (2) 404 can thus be expressed respectively by the following equations.

$$L\_V(1) = 1 \times Ba\_V1 + 0 \times Ba\_V2 \quad (2)$$

($\alpha=1, \beta=0$)

$$L\_V(2) = 0 \times Ba\_V1 + 1 \times Ba\_V2 \quad (3)$$

($\alpha=0, \beta=1$)

The line screen information configured by such screen vectors forms the lines which run through a plurality of dots that are output by performing basic screen processing. As a result, the basic screen and the line screen can be continuously and smoothly changed.

Further, according to the above-described example, two line screens are used. However, three or more line screens may be used. In such a case, the line screen information is configured by the screen vectors satisfying equation (1).

Figure 5:
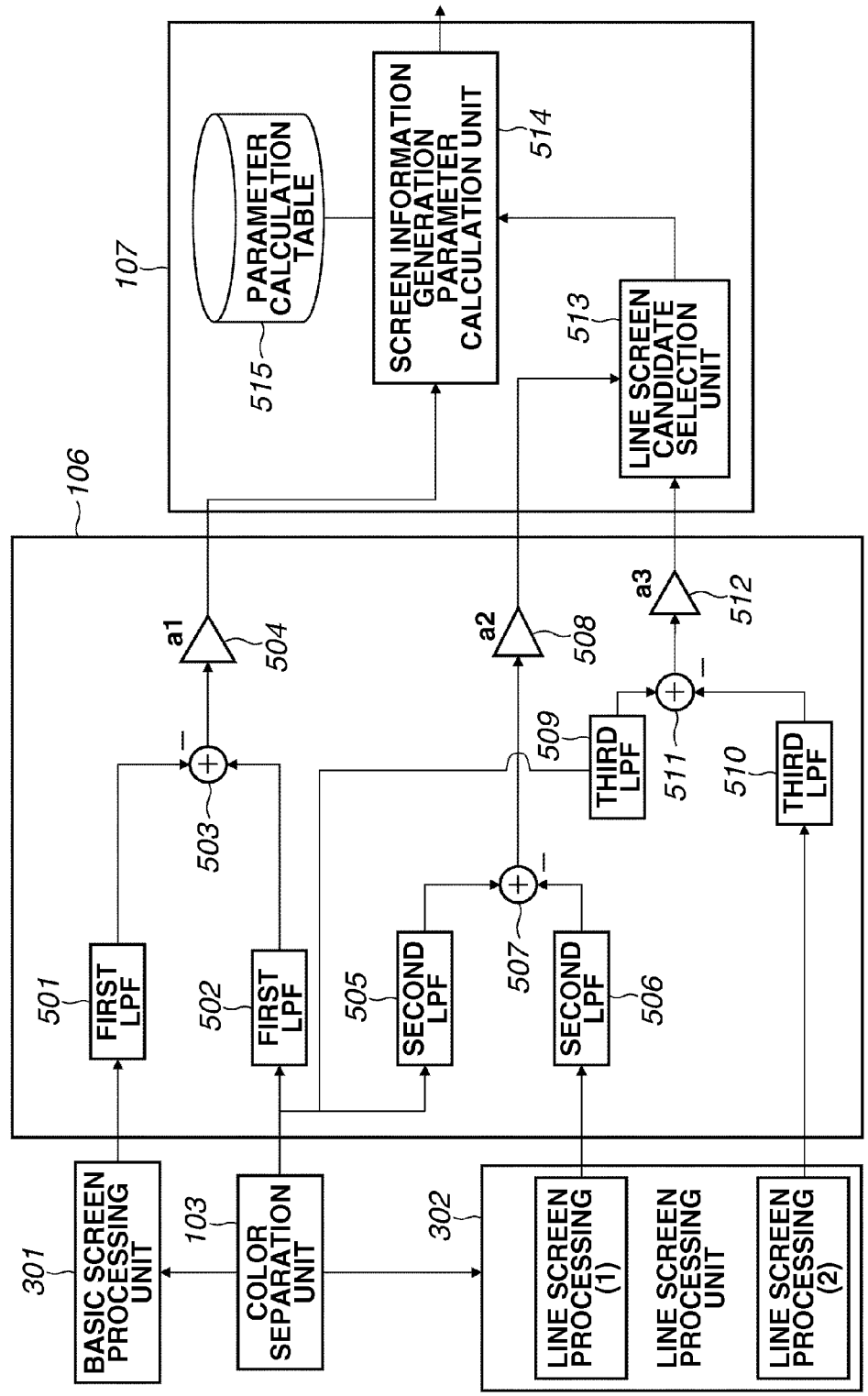
FIG. 5 illustrates an evaluation value calculation unit.

FIG. 5 illustrates the evaluation calculation unit 106. The evaluation calculation unit 106 calculates the evaluation value of each screen processing result.

Referring to FIG. 5, a first LPF 501 performs filter processing on the basic screen binary data, and calculates a basic screen low-frequency component. The cut-off frequency of the first LPF corresponds to frequency characteristics of the basic screen. A first LPF 502 which is the same filter as the first LPF 501 then performs filter processing on the image data after color separation has been performed (i.e., the image data before performing basic screen processing). The first LPF 502 thus calculates a first image data low-frequency component.

A subtraction unit 503 calculates a difference between the first image data low-frequency component and the basic screen low-frequency component. A weight integration unit 504 then integrates the calculated difference and a weight coefficient a1 (a real number), and outputs the result as the evaluation value of the basic screen processing result.

Second LPFs 505 and 506 and a weight coefficient a2 (i.e., a real number) corresponding to the frequency characteristics of the line screen (1) are used with respect to the line screen (1) binary data. The evaluation value of the result of performing basic screen processing on the line screen (1) is thus calculated, similarly as the evaluation value of the basic screen processing result. Further, third LPFs 509 and 510 and a weight coefficient a3 (i.e., a real number) corresponding to the frequency characteristics of the line screen (2) are used with respect to the line screen (2) binary data. The evaluation value of the result of performing basic screen processing on the line screen (2) is thus similarly calculated.

The evaluation value will be described below, In general, if the thin lines are broken, the edges are jaggy, or moiré is generated in the image, interference is generated in the frequency which is lower than a screen frequency (i.e., frequency of halftone dots). The reproducibility of the image can thus be more correctly evaluated by comparing the image data with the binary data after performing screen processing, in the frequency lower than the screen frequency.

The evaluation value calculated from the difference between the low-frequency component of the image data and the low-frequency component of the screen binary data indicates the reproducibility of the binary data with respect to the input image data. The reproducibility is higher when the evaluation value (i.e., the difference between the image data) is smaller.

Figure 6A:
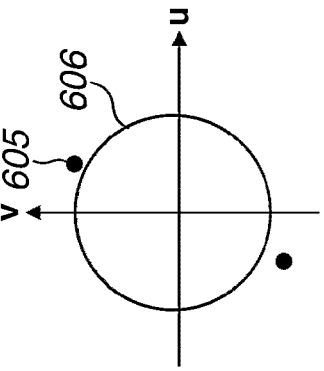
FIGS. 6A, 6B, and 6C illustrate frequency characteristics of each screen processing and cut-off frequencies of corresponding low-pass filters.
Figure 6B:
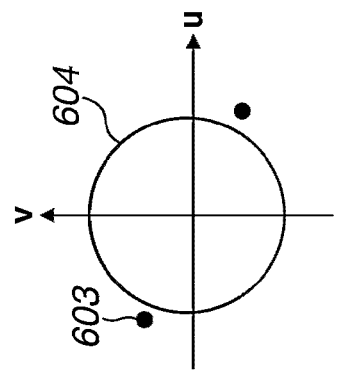
Figure 6C:
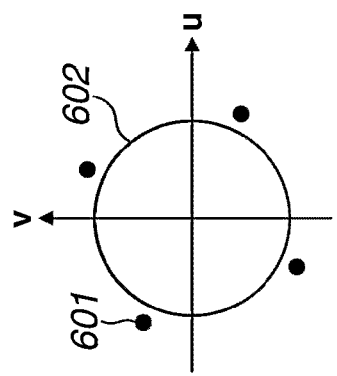

FIGS. 6A, 6B, and 6C illustrate the frequency characteristics of each screen processing and the cut-off frequencies of each LPF. Referring to FIGS. 6A, 6B, and 6C, an origin indicates a direct current component, a vertical axis indicates spatial frequency in a vertical direction, and a horizontal axis indicates the spatial frequency in a horizontal direction. The frequency component becomes higher as the distance from the origin increases in the horizontal direction or the vertical direction.

FIG. 6A illustrates the screen frequency characteristics of basic screen processing. According to the present exemplary embodiment, the dot screen information 402 including the screen vectors 408 and 409 illustrated in FIG. 4 will be used in performing basic screen processing. As a result, a screen frequency characteristic 601 of the frequency corresponding to the screen vectors 408 and 409 is acquired.

According to the present exemplary embodiment, a cut-off frequency 602 of the first LPF 501 and 502 is then set at a frequency lower than the screen frequency characteristic 601. In other words, the first LPFs 501 and 502 extract the frequencies lower than the screen frequency characteristic 601.

FIG. 6B illustrates a screen frequency characteristic 603 acquired by performing line screen processing (1), and FIG. 6C illustrates a screen frequency characteristic 605 acquired by performing line screen processing (2). Each of the screen frequency characteristic 603 and the screen frequency characteristic 605 respectively corresponds to a screen vector 413 and a screen vector 414 illustrated in FIGS. 4A to 4D. Further, a cut-off frequency 604 and a cut-off frequency 605 are set at the frequencies lower than the screen frequency characteristics 603 and the screen frequency characteristics 605 respectively.

As described above, the cut-off frequency of each LPF is set lower than the corresponding screen frequency. The screen component of the data acquired by performing each screen processing can thus be removed by performing filter processing using the LPF corresponding to the screen frequency characteristic.

According to the present exemplary embodiment, since the screen frequencies are approximately equal, the LPF of the same cut-off frequency is used for the first LPF, the second LPF, and the third LPF. Further, it is not necessary for the LPF used in performing filter processing on the image data to be the same as the LPF corresponding to screen processing performed for calculating the evaluation value, as long as it is an approximate.

Image processing performed by the above-described image processing apparatus 1 illustrated in FIG. 1 will be described below with reference to the flowchart illustrated in FIG. 2. According to the present exemplary embodiment, the process is performed for each pixel.

In step S201, multivalued color input image data is stored in the input image buffer 102. In step S202, the color separation unit 103 uses the color separation LUT 104 to separate the R, G, and B color input image data to the image data of four planes, i.e., C, M, Y, and K. As a result, multi-valued image data $D\_c$, $D\_m$, $D\_y$, and $D\_bk$ are acquired, as indicated in the following equations. According to the present exemplary embodiment, each image data is 8 bit data. However, the bit number for the image data may be larger.

$$D\_c = C\_LUT\_3D(R, G, B) \quad (4)$$

$$D\_m = M\_LUT\_3D(R, G, B) \quad (5)$$

$$D\_y = Y\_LUT\_3D(R, G, B) \quad (6)$$

$$D\_bk = K\_LUT\_3D(R, G, B) \quad (7)$$

Each function defined on right sides of equations (4), (5), (6), and (7) corresponds to the content of the color separation LUT 104. The color separation LUT 104 determines an output value of each color material from the three input values of R, G, and B.

Step S203 to step S208 to be described below are independently performed for image data of each plane acquired by the color separation unit 103.

In step S203, the basic screen processing unit 301 (illustrated in FIG. 3) performs as basic screen processing, dot screen processing on each of the image data $D\_c$, $D\_m$, $D\_y$, and $D\_bk$. More specifically, the basic screen processing unit 301 compares the image data of the target pixel and the threshold value corresponding to the target pixel in the dot screen information and performs binarization. The dot screen information for each of the image data C, M, Y, and K is stored in the basic screen information table 303, and includes threshold values $Ba\_Th\_c$, $Ba\_Th\_m$, $Ba\_Th\_y$, and $Ba\_Th\_bk$ respectively.

According to the present exemplary embodiment, basic screen processing is performed on cyan (C) using the dot screen information 402 illustrated in FIG. 4, so that the image data of cyan is binarized as in the following equations.

$$\text{If } D\_c < Ba\_Th\_c, \text{ then } Out\_Ba\_c = 0 \quad (8)$$

$$\text{If } D\_c \geq Ba\_Th\_c, \text{ then } Out\_Ba\_c = 255 \quad (9)$$

The basic screen processing unit 301 similarly performs processing on magenta, yellow, and black image data.

The dot screen information of cyan is the dot screen information 402 illustrated in FIG. 4, and includes two screen vectors, i.e., $Ba\_c\_V1$ (408) $(x, y) = (3, 2)$ and $Ba\_c\_V2$ (409) $(x, y) = (-2, 3)$. The two screen vectors become the basic screen vectors of cyan.

Further, the basic screen vectors of magenta are $Ba\_m\_V1$ $(x, y) = (2, 3)$ and $Ba\_m\_V2$ $(x, y) = (-3, 2)$. Similarly, the basic screen vectors of yellow are $Ba\_y\_V1$ $(x, y) = (2, 2)$ and $Ba\_y\_V2$ $(x, y) = (-2, 2)$, and of black are $Ba\_bk\_V1$ $(x, y) = (0, 4)$ and $Ba\_y\_V2$ $(x, y) = (-4, 0)$.

In step S204, the line screen processing unit 302 performs line screen processing with respect to the image data $D\_c$, $D\_m$, $D\_y$, and $D\_bk$. The line screen processing unit 107 performs the line screen processing (1) and the line screen processing (2) for each of the image data $D\_c$, $D\_m$, $D\_y$, and $D\_bk$, and outputs two different line screen binary data for each color.

More specifically, the line screen processing unit 302 compares the image data of the target pixel and the threshold value corresponding to the target pixel in the line screen information and performs binarization. The line screen information is stored in the line screen information table 304 illustrated in FIG. 3. The line screen (1) information for each of C, M, Y, and K colors include threshold values $L\_Th\_c(1)$, $L\_Th\_m(1)$, $L\_Th\_y(1)$, and $L\_Th\_bk(1)$. The line screen (2) information of each of C, M, Y, and K colors include threshold values $L\_Th\_c(2)$, $L\_Th\_m(2)$, $L\_Th\_y(2)$, and $L\_Th\_bk(2)$.

According to the present exemplary embodiment, the line screen information (1) 403 and the line screen information (2) 404 illustrated in FIG. 4 are used to perform line screen processing of cyan image data. The image data is thus binarized as indicated by the following equations.

Line screen processing (1):

$$\text{If } D\_c < L\_Th\_c(1), \text{ then } Out\_L\_c(1) = 0 \quad (10)$$

$$\text{If } D\_c \geq L\_Th\_c(1), \text{ then } Out\_L\_c(1) = 255 \quad (11)$$

Line screen processing (2):

$$\text{If } D\_c < L\_Th\_c(2), \text{ then } Out\_L\_c(2) = 0 \quad (12)$$

$$\text{If } D\_c \geq L\_Th\_c(2), \text{ then } Out\_L\_c(2) = 255 \quad (13)$$

According to the present exemplary embodiment, each of the line screen vectors of cyan is set as follows as illustrated in FIG. 4. The line vector $L\_c\_V(1)$ 413 is set to $(x, y) = (3, 2)$, and the line vector $L\_c\_V(2)$ 414 is set to $(x, y) = (-2, 3)$. In other words, the above-described line screen processing each includes one screen vector. Further, the starting points of screen vectors L_c_V(1) and L_c_V(2) are the same as the starting points of the basic screen vectors Ba_c_V1 and Ba_c_V2.

Two types of line screen processing including the line screen vectors L_m_V(1) (x, y)=(2, 3) and L_m_V(2) (x, y)=(−3, 2) are set for magenta. Two types of screen processing including the line screen vectors L_y_V(1) (x, y)=(2, 2) and L_m_V(2)(x, y)=(−2, 2) are set for yellow. Two types of line screen processing including the line screen vectors L_bk_V (1) (x, y)=(0, 4) and L_m_V(2)(x, y)=(−4, 0) are set for black.

Line screen processing including the line screen vector satisfying equation (1) is thus set to all of the colors. Further, the starting point of the line screen vector is the same as the starting point of the basic screen vector for each color. In other words, the phases (positions) of the basic screen vector and the line screen vector are the same for each color.

In step S205, the evaluation calculation unit 109 calculates the evaluation value of each screen processing result for each pixel. Cyan will be described below as an example, and the same process is also performed for magenta, yellow, and black.

The first LPF 501 illustrated in FIG. 5 performs filtering processing with respect to basic screen binary data Out_Ba_c, and calculates a basic screen low-frequency component Out_Ba_c_f.

$$\text{Out\_Ba\_c\_f} = \text{Out\_Ba\_c} * (\text{LPF\_1}) \tag{14}$$

wherein "*" indicates convolution, and "LPF_1" indicates the first low pass filter.

The second LPF 502 then performs filter processing with respect to the image data D_c, and calculates a first image data low-frequency component D_c_f_1.

$$D\_c\_f\_1 = D\_c * (\text{LPF\_1}) \tag{15}$$

"*" indicates convolution, and "LPF_1" indicates the first low pass filter. Further, the same low pass filter as that in equation (14) is used in equation (15).

The subtraction unit 503 then outputs the difference between the first image data low-frequency component D_c_f_1 and the basic screen low-frequency component Out_Ba_c_f. Further, the weight integration unit 504 integrates the difference and the weight coefficient a1 (real number), and calculates an evaluation value of the basic screen processing result, i.e., P_Ba_c.

$$P\_Ba\_c = (-\text{Out\_Ba\_c\_f} + D\_c\_f\_1) \times a1 \tag{16}$$

The second LPF 505 then performs filtering processing on the line screen (1) binary data Out_L_c(1), and calculates a line screen (1) low-frequency component Out_L_c_f(1).

$$\text{Out\_L\_c\_f}(1) = \text{Out\_L\_c}(1) * (\text{LPF\_2}) \tag{17}$$

Wherein "*" indicates convolution, and "LPF_2" indicates the second low pass filter.

Further, the second LPF 506 performs filtering processing on the image data D_c, and calculates a second image data low-frequency component D_c_f_2.

$$D\_c\_f\_2 = D\_c * (\text{LPF\_2}) \tag{18}$$

Wherein "*" indicates convolution, and "LPF_2" indicates the second low pass filter. The same low pass filter as that in equation (17) is used in equation (18).

The subtraction unit 507 then outputs the difference between the second image data low-frequency component D_c_f_2 and the line screen (1) low-frequency component Out_L_c_f(1). Further, the weight integration unit 508 integrates the difference and the weight coefficient a2 (real number), and calculates the evaluation value of the line screen (1) processing result, i.e., P_L_c(1).

$$P\_L\_c(1) = (-\text{Out\_L\_c\_f}(1) + D\_c\_f\_2) \times a2 \tag{19}$$

Similarly, the third LPF 510 performs filtering processing on the line screen (2) binary data Out_L_c(2), and calculates a line screen (2) low-frequency component Out_L_c_f(2).

$$\text{Out\_L\_c\_f}(2) = \text{Out\_L\_c}(2) * (\text{LPF\_3}) \tag{20}$$

Wherein "*" indicates convolution, and "LPF_3" indicates the third low pass filter.

Further, the third LPF 509 performs filtering processing on the image data D_c, and calculates a third image data low-frequency component D_c_f_3.

$$D\_c\_f\_3 = D\_c * (\text{LPF\_3}) \tag{21}$$

Wherein "*" indicates convolution, and "LPF_3" indicates the third low pass filter. The same low pass filter as that in equation (20) is used in equation (21).

The subtraction unit 511 then outputs the difference between the third image data low-frequency component D_c_f_3 and the line screen (2) low-frequency component Out_L_c_f(2). Further, the weight integration unit 512 integrates the difference and the weight coefficient a3 (real number), and calculates the evaluation value of the line screen (2) processing result, i.e., P_L_c(2).

$$P\_L\_c(2) = (-\text{Out\_L\_c\_f}(2) + D\_c\_f\_3) \times a3 \tag{22}$$

The process performed by the evaluation calculation unit 106 thus ends. The reproducibility becomes higher as the evaluation value becomes smaller. According to the present exemplary embodiment, the coefficients a1, a2, and a3 of the weight integration units 504, 508, and 512 are set to 1.0. However, this is not a limitation, and the coefficients may be any positive real number. If the coefficients a1, a2, and a3 are greater than 1, the error increases, so that the evaluation value becomes degraded. Further, if the coefficients a1, a2, and a3 are less than 1, the error decreases, so that the evaluation value is improved.

In step S206, the screen information generation parameter calculation unit 107 calculates the parameters for generating the combined screen information for each pixel, based on the evaluation values of all screen processing results. Cyan will be described below as an example, and the same process is also performed for magenta, yellow, and black.

The process performed by the screen information generation parameter calculation unit 107 will be described below with reference to FIG. 5. A line screen candidate selection unit 513 selects line screen processing to be a candidate.

More specifically, the line screen candidate selection unit 513 acquires an absolute value of the evaluation value of each screen processing result, and compares the absolute values. The reproducibility is higher when the absolute value of the evaluation value is smaller. The line screen candidate selection unit 513 thus selects as the candidate, line screen processing that results in higher reproducibility. Information about the selected line screen processing and the evaluation value of the selected line screen processing are stored as L_SC_flg and L_SC_Abs.

```
if(Abs(P_L_c(1)) < Abs(P_L_c(2)) + q)
L_SC_flg_c = 1
L_SC_Abs_c = Abs(P_L_c(1))
}else{
L_SC_flg_c = 2
L_SC_Abs_c = Abs(P_L_c(2))
}                                                    (23)
```

According to the present exemplary embodiment, q=0.0. However, q may be set a value such as 0.1. If q is a positive value, line screen processing (1) is preferentially selected. If q is a negative value, line screen processing (2) is preferentially selected. A screen information generation parameter calculation unit 514 then determines the proportions by which the basic screen information and the line screen information will be combined, and then calculates the parameters. An absolute value Ba_SC_Abs_c of the evaluation value P_Ba_c of the basic screen processing result is calculated as follows.

$$Ba\_SC\_Abs\_c = Abs(P\_Ba\_c) \quad (24)$$

Parameters W_Ba and W_L for generating the combined screen information satisfy the following condition.

$$W\_Ba + W\_L = 1.0 \quad (25)$$

The parameters W_Ba_c and W_L_c for cyan are calculated using Ba_SC_Abs_c and L_SC_Abs_c, by referring to a parameter calculation table 515 illustrated in FIG. 7. The parameter calculation table 515 is commonly used with respect to C, M, Y, and K. Referring to FIG. 7, the parameter calculation table 515 is managed as a two-dimensional array. A horizontal axis of the array indicates Ba_SC_Abs, a vertical axis indicates L_SC_Abs, and values in the table indicate W_Ba. Numbers 0.5, 1, 3, 5, 10, 50, and 100 indicated in the horizontal axis and the vertical axis of the array are coordinates of the values of W_Ba when each evaluation value is less than or equal to the indicated value.

For example, if Ba_SC_Abs_c=3.3 and L_SC_Abs_c=1.4, Ba_SC_Abs_c≤5 and L_SC_Abs_c≤3 are satisfied, so that W_Ba_c=0.5. As a result, W_L_c=0.5 from the relationship described in equation (25).

Figure 2:
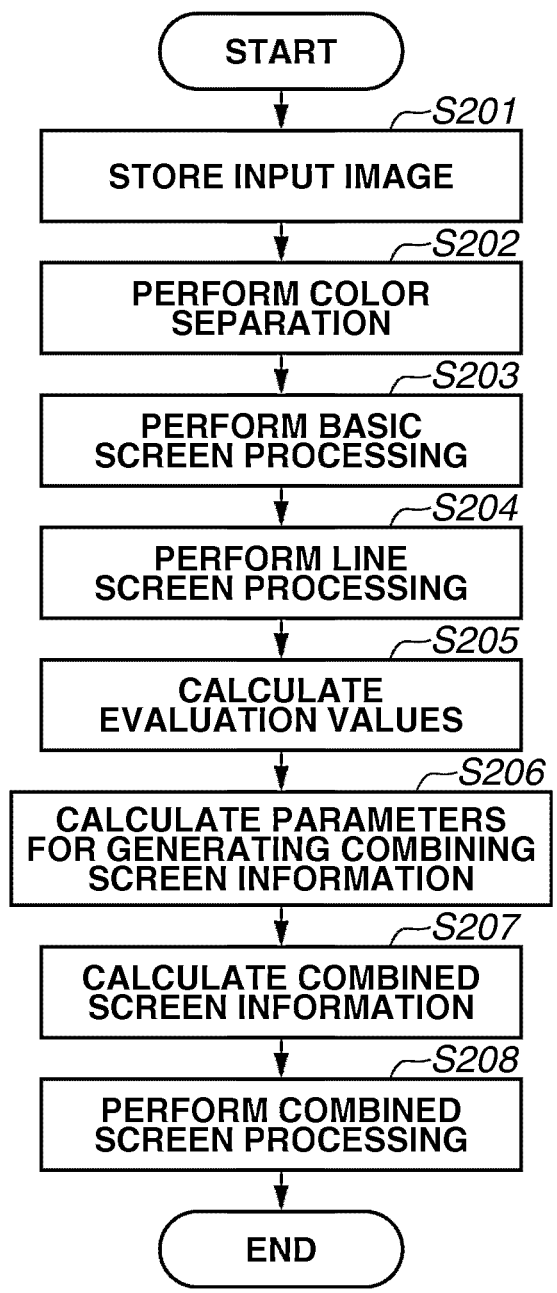
FIG. 2 is a flowchart illustrating image processing.

In step S207 illustrated in FIG. 2, the combined screen information calculation unit 108 calculates the combined screen information. Cyan will be described below as an example, and the same process is also performed for magenta, yellow, and black.

A threshold value configuring the combined screen information is generated by the following equation using the parameters W_Ba_c and W_L_c.

$$M\_Th\_c = g\_t(W\_Ba\_c) \times (W\_Ba\_c \times Ba\_Th\_c + W\_L \times L\_TH\_c(L\_SC\_flg\_c)) \quad (26)$$

(L_SC_flg_c is k (1 or 2 according to the present exemplary embodiment). g_t (W_Ba_c) is 1.0.

Figure 8:
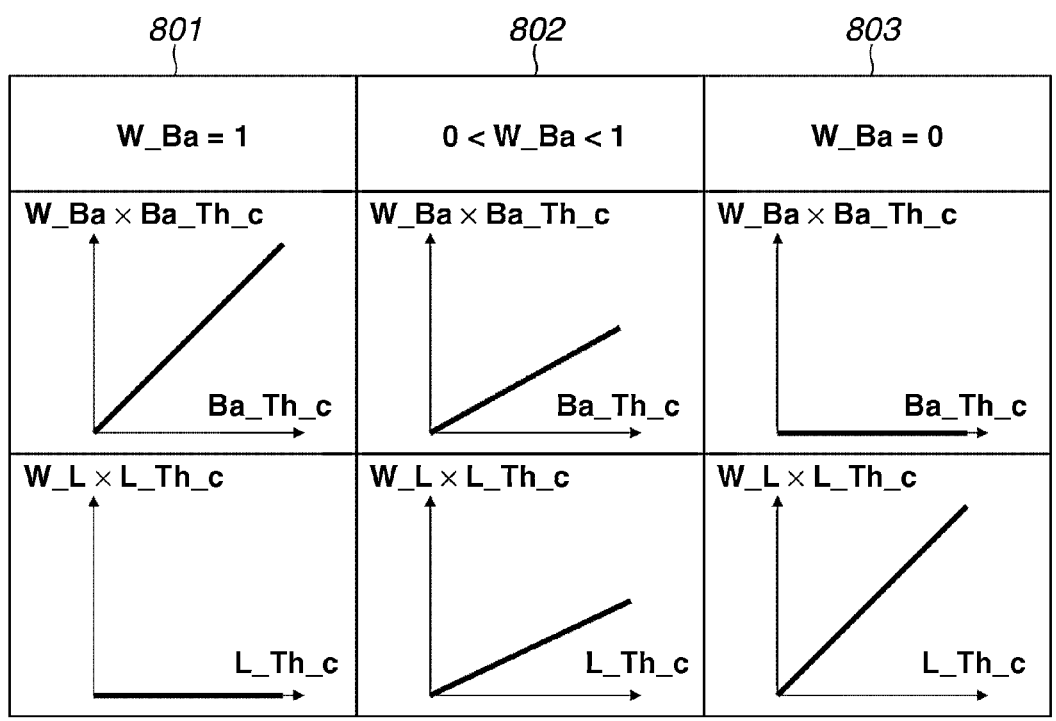
FIG. 8 illustrates an operation of a combined screen information calculation unit.

FIG. 8 illustrates the operation of the combined screen information calculation unit. According to the present exemplary embodiment, M_Th_c calculated using equation (26) is indicated by the linear combination of Ba_Th_c and L_TH_c (L_SC_flg_c), and the sum of the parameters always become 1 as indicated in equation (25). Referring to FIG. 8, if W_Ba=1 (801), the threshold value Ba_TH_c of the basic screen information is directly assigned to M_Th_c. On the other hand, if W_L=1 (803), the threshold value L_Th_c of the selected line screen information is directly assigned to M_Th_c. If 0<W_Ba<1 (802), a combined value of the threshold value Ba_TH_c of the basic screen information and the threshold value L_Th_c of the line screen information becomes M_Th_c. For example, if W_Ba_c=0.5 (i.e., W_L_c=0.5), an intermediate value of Ba_TH_c and L_TH_c(L_SC_flg_c) becomes the threshold value M_Th_c.

According to the above-described example, g_t (W_Ba_c)= 1.0 as illustrated in equation (26). However, this is not a limitation. For example, g_t may change according to a combination ratio (W_Ba_c). In other words, g_t may become a positive real number that changes according to W_Ba_c. If the combination ratio is W_Ba_c=0.5 and W_L_c=0.5, g_t may become 1.2, or g_t may become 0.8.

More specifically, if g_t=1.0 is constantly set, the number of dots that is output may not be maintained when W_Ba_c=0.5 and W_L_c=0.5 and when W_Ba_c=1.0 and W_L_c=0.0. To solve such a problem, the number of dots that is output is maintained for all combination ratios by previously setting g_t (W_Ba) to change according to the combination ratio.

According to the above-described example, the calculation of the threshold value M_Th_c of the combined screen information for cyan is illustrated. The combined screen information of magenta M_Th_m, yellow M_Th_y, and black M_Th_bk are also calculated using a rule similar to equation 27.

In step S208 illustrated in FIG. 2, the combined screen processing unit 109 then refers to the combined screen information corresponding to each color and performs screen processing with respect to the image data D_c, D_m, D_y, and D_bk. More specifically, the combined screen processing unit 109 compares the image data of the target pixel and the threshold value corresponding to the target pixel in the combined screen information calculated by the combined screen information calculation unit 108. The combined screen processing unit 109 then performs binarization. The process can be described as follows using cyan as an example.

$$\text{If } D\_c < M\_Th\_c, \text{Out\_M\_c} = 0 \quad (27)$$

$$\text{If } D\_c \geq M\_Th\_c, \text{Out\_M\_c} = 255 \quad (28)$$

Screen processing is similarly performed for magenta, yellow, and black, based on the calculated combined screen information.

The combined screen binary data calculated by the combined screen processing unit 109 is stored in the screen image storing buffer 110, and is output from the output terminal 111 to the image forming apparatus 2. Image processing thus ends.

According to the present exemplary embodiment, dot screen processing, line screen processing, or screen processing which is an intermediate between dot screen processing and line screen processing is applied for each pixel according to the evaluation value of each screen processing result. Since the line screen vector satisfies equation (1), and the line screen vector is set to start from the same starting point as the basic screen vector, the positions of the generated dots change smoothly even when the screen is switched. As a result, visually desirable binarization can be realized even when a plurality of screens is used for each pixel.

Further, according to the present exemplary embodiment, the screen vectors which are different for each color are set in both the basic screen information and the line screen information, with respect to each of cyan, magenta, yellow, and black colors. The screen vectors are thus different for each color in the calculated combined screen information for each color, in all regions including a flat portion without the thin lines or the edge, the thin line portion, and the edge portion. As a result, the combined screen information is tolerant with respect to physical misregistration (i.e., color misregistration).

Further, according to the present exemplary embodiment, the parameter calculation table 515 illustrated in FIG. 7 is used, so that unnecessary switching of the screens is not performed when there is a small amount of noise in the image. Line screen processing is applied only when the reproducibility of the basic screen is low, as illustrated in the parameter calculation table 515. In other words, if deterioration in reproducibility is small in the basic screen processing result, basic screen processing is constantly employed.

If the image includes noise or a small amount of edge, the reproducibility may become higher in the line screen processing result as compared to the basic screen processing result. However, if processing then is frequently switched to line screen processing, the output may become unstable. The setting as illustrated in FIG. 7 is thus effective in stably outputting the image.

Figure 9:
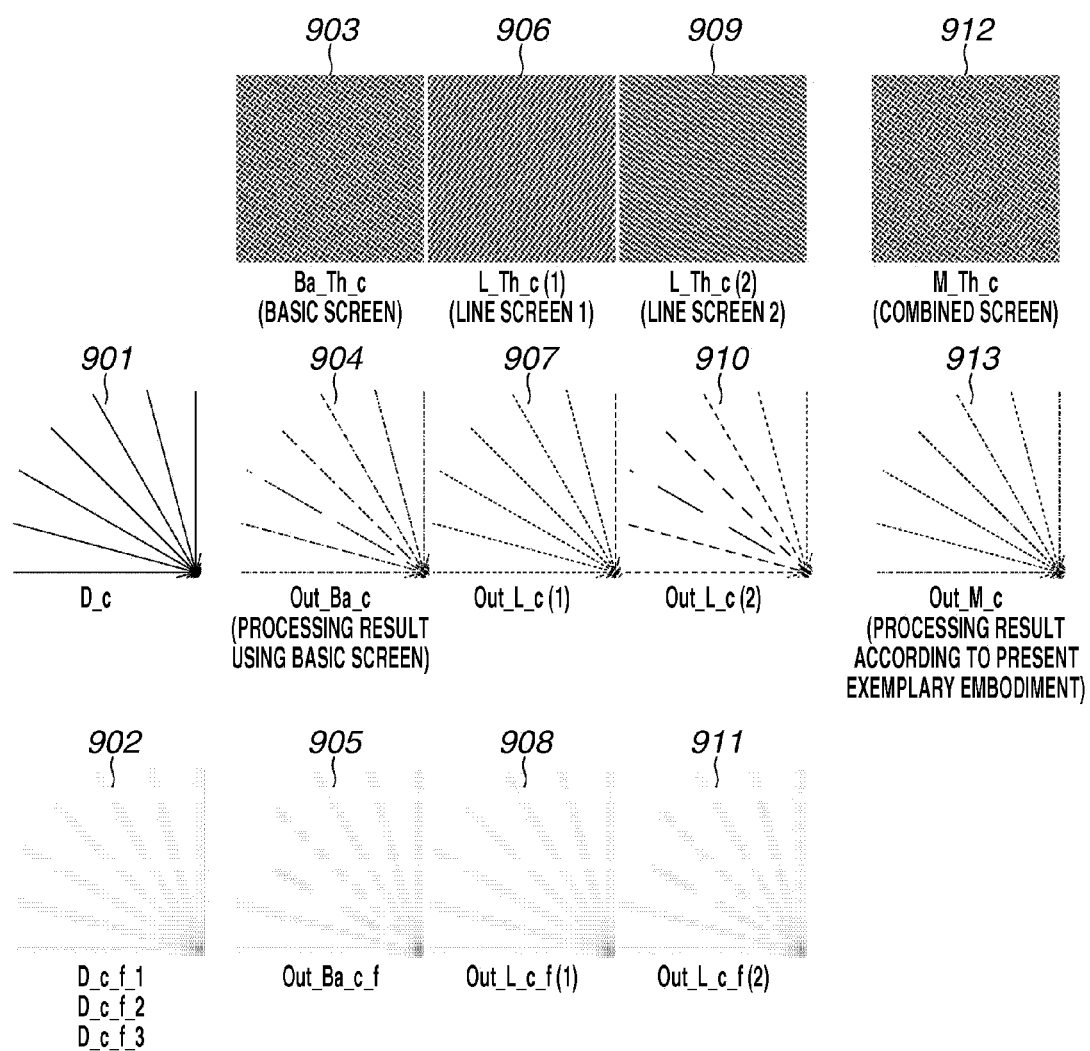
FIG. 9 illustrates an effect on a thin line image.
Figure 10:
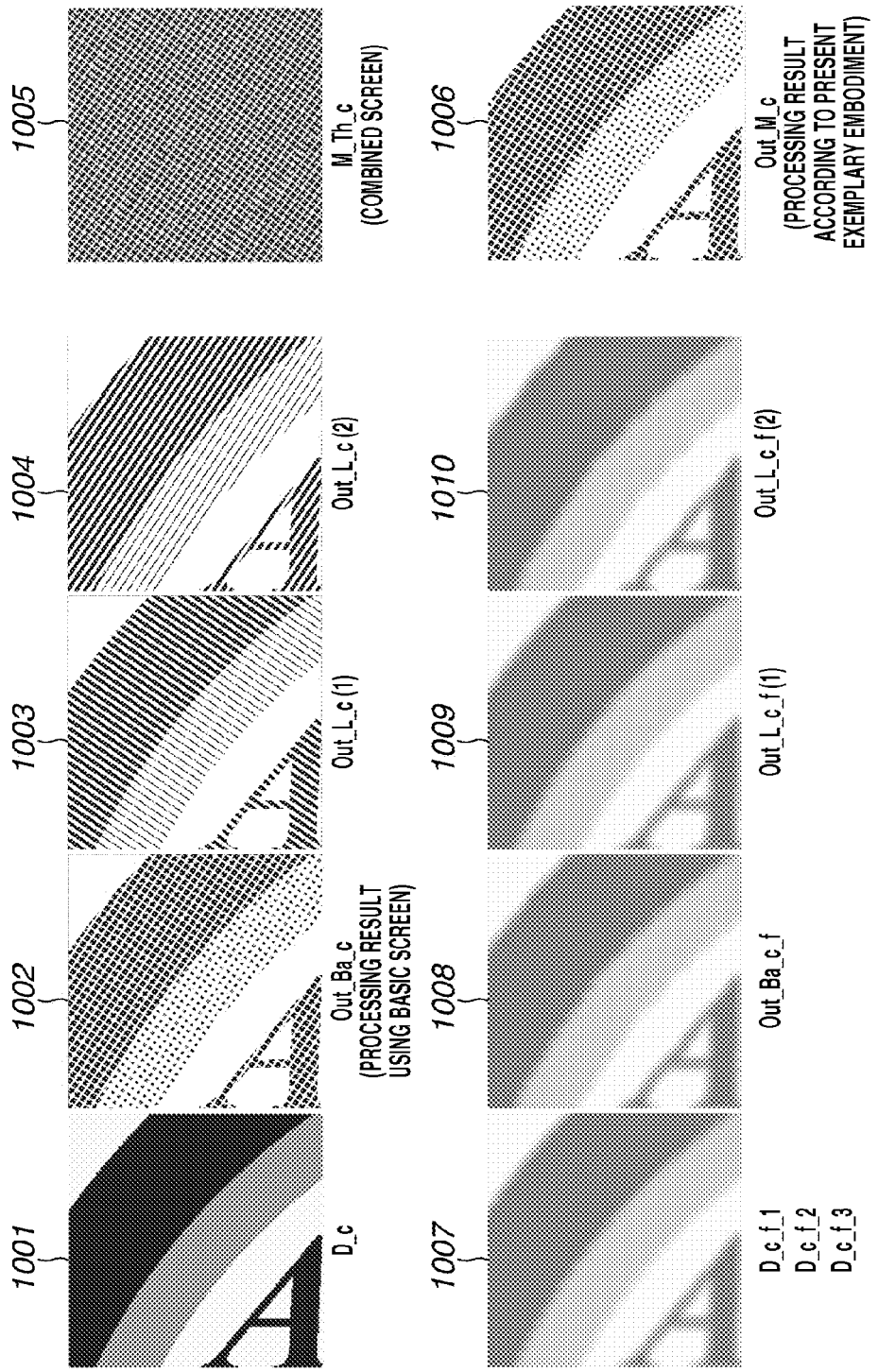
FIG. 10 illustrates an effect on an edge image.
Figure 11:
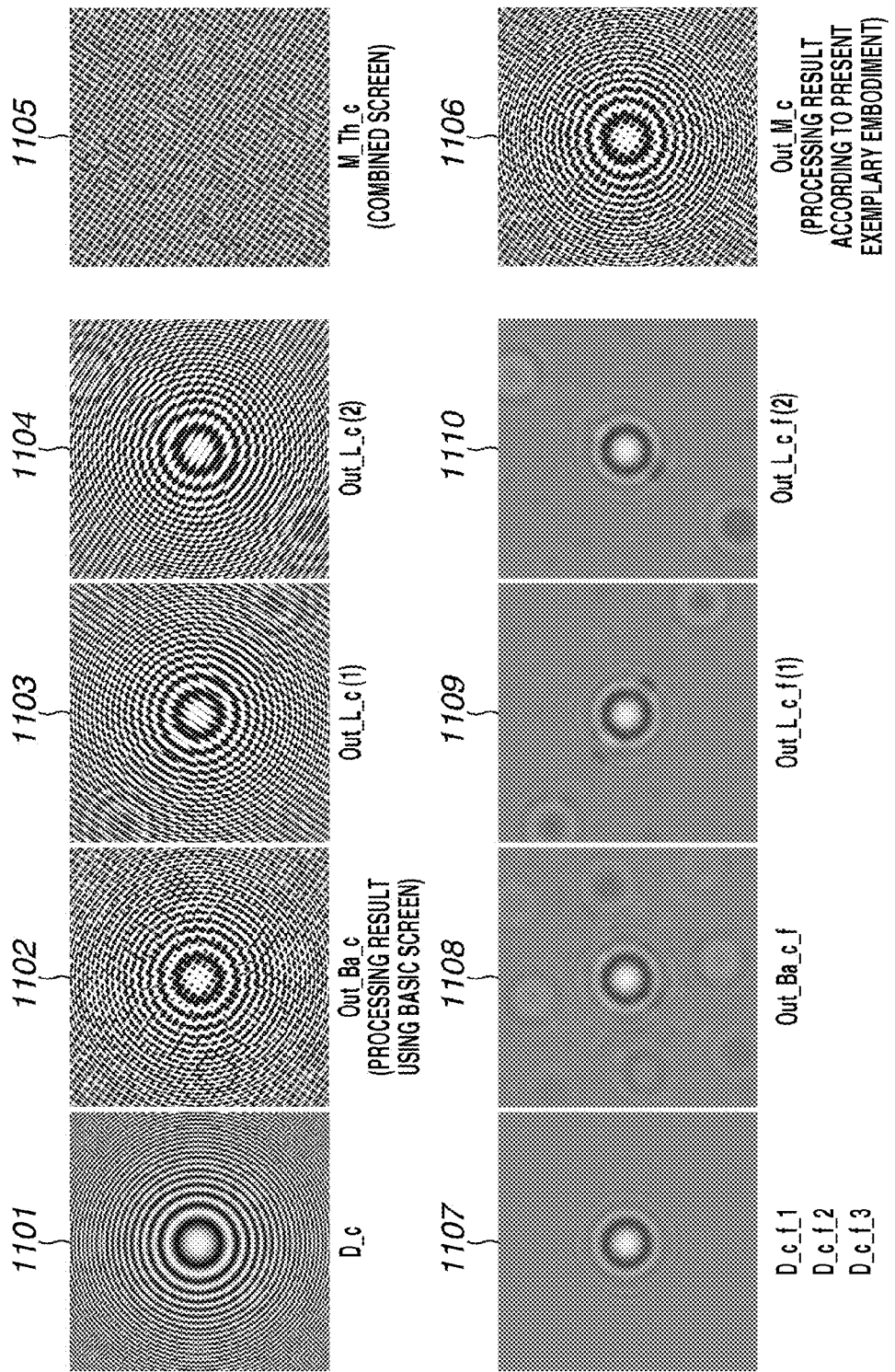
FIG. 11 illustrates an effect on an image in which various frequencies are included.

FIGS. 9, 10, and 11 illustrate the effects of performing processing according to the above-described exemplary embodiment 1. FIG. 9 illustrates the screen processing result of the thin lines image, FIG. 10 illustrates the screen processing result of the edge image, and FIG. 11 illustrates the screen processing result of an image including various frequency components.

Referring to FIG. 9, if screen processing is performed on a thin lines image 901 using basic screen information 903, a result 904 is acquired. If screen processing is performed on the input image 901 using line screen information (1) 906 and line screen information (2) 909, results 907 and 910 are acquired respectively. A screen processing result 913 which is acquired by referring to the combined screen information indicates that the thin lines which are broken in the result 904 are sufficiently reproduced.

The screen information in combined screen information 912 changes in the vicinity of the thin lines. More specifically, line screen processing of large angular difference is applied with respect to the direction (vector) of the thin lines.

Furthermore, it is difficult to visually confirm that combined screen processing is continuously and smoothly changing. However, it can be seen by focusing on the thin lines of the combined screen information that screen processing is changing in a region which is wider than the width of the thin lines. This is a result of using the LPF when evaluating the reproducibility.

The results of performing filtering processing using the LPF are illustrated as results 902, 905, 908, and 911. The reproducibility of the thin lines can be evaluated for the thin lines and the regions around the thin lines by using the LPF. Combined screen processing thus continuously and smoothly changes.

Line screen processing and the dot screen processing each continuously and smoothly change between each other, locally for the thin line at an angle of 45°. This is a result of generating the line screen based on the condition of equation (1) and setting the starting points of the line screen vector to be the same as the starting point of the basic screen vector. Further, such a result is achieved by calculating the combined screen information as in equation (27). The processing result 913 in which the thin lines are highly reproduced is thus acquired.

FIG. 10 illustrates an edge image 1001, and screen processing results 1002, 1003, 1004 thereof, using the basic screen information 903, the line screen information (1) 906, and the line screen information (2) 909 illustrated in FIG. 9. If the screen processing results 1002, 1003, and 1004 are compared with processing result 1006 acquired using combined screen information 1005, it can be viewed that the jaggy edge portion generated in the processing result 1003 is reduced.

Screen processing is changing in the edge portion of the combined screen information 1005. Further, line screen processing of large angular difference is applied with respect to the direction (vector) of the edge in such a change.

It is difficult to visually confirm that combined screen processing is continuously and smoothly changing in the edge portion illustrated in FIG. 10, similarly as in the case of the thin lines image. However, it can be seen that screen processing is changing in a wider region as compared to the width of the edge portion.

Such a result is due to performing the evaluation using the LPF. The results of performing filtering processing using the LPF are illustrated as results 1007, 1008, 1009, and 1010. The reproducibility of the edges can be evaluated for the edges and the regions around the edges by using the LPF. The combined screen thus continuously and smoothly changes in the surrounding region of the edge.

Line screen processing and dot screen processing continuously and smoothly change between each other, locally for the edge at an angle of 45°. This is a result of generating the line screen vector based on the condition of equation (1) and setting the starting point of the line screen vector to be the same as the starting point of the basic screen vector. Further, such a result is achieved by calculating the combined screen information as in equation (26). As a result, the processing result 1006 in which the edge is highly reproduced is acquired.

Further, a stable result using basic screen processing is acquired in the flat region of the input image in which there are no thin lines and edges. Such a result is acquired as the effect of setting the parameter calculation table illustrated in FIG. 7.

FIG. 11 illustrates the effect with respect to an image 1101 in which various frequencies are included. Results 1102, 1103, and 1104 are acquired respectively as the screen processing results using the basic screen information 903, the line screen information (1) 906, and the line screen information (2) 909. The moiré generated in the result 1102 is appropriately reduced compared with a screen processing result 1106 using combined screen information 1105.

Screen processing is changing in the region of the combined screen information 1106 in which the moiré is generated in the result 1102. Further, line screen processing in which angular difference is large is applied with respect to the pattern 1101 in such a change.

According to the first exemplary embodiment, a high quality image can be reproduced by appropriately evaluating the screen processing result and controlling screen processing.

According to the first exemplary embodiment, dot screen processing using the dot screen information is performed as basic screen processing. According to a second exemplary embodiment, line screen processing using the line screen information is performed as basic screen processing. The basic configuration according to the second exemplary embodiment is similar to those according to the first exemplary embodiment excluding the screen processing unit 105.

In general, there is one screen vector in the line screen information. However, if the line screen information is referred to in performing basic screen processing, a virtual screen vector is defined in addition to the line screen vector. The definition of the virtual screen vector will be described in detail below.

Figure 12A:
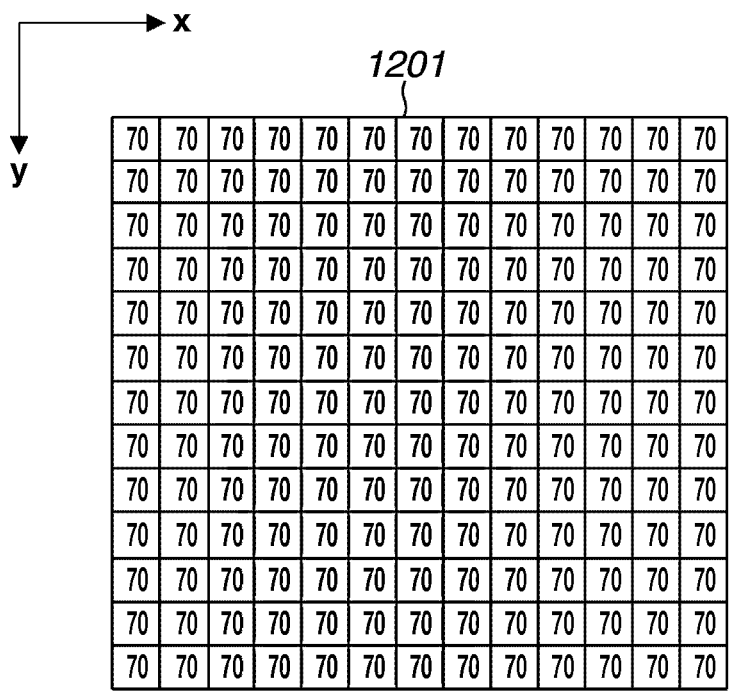
FIGS. 12A to 12B illustrate line screen processing performed as basic screen processing.
Figure 12B:
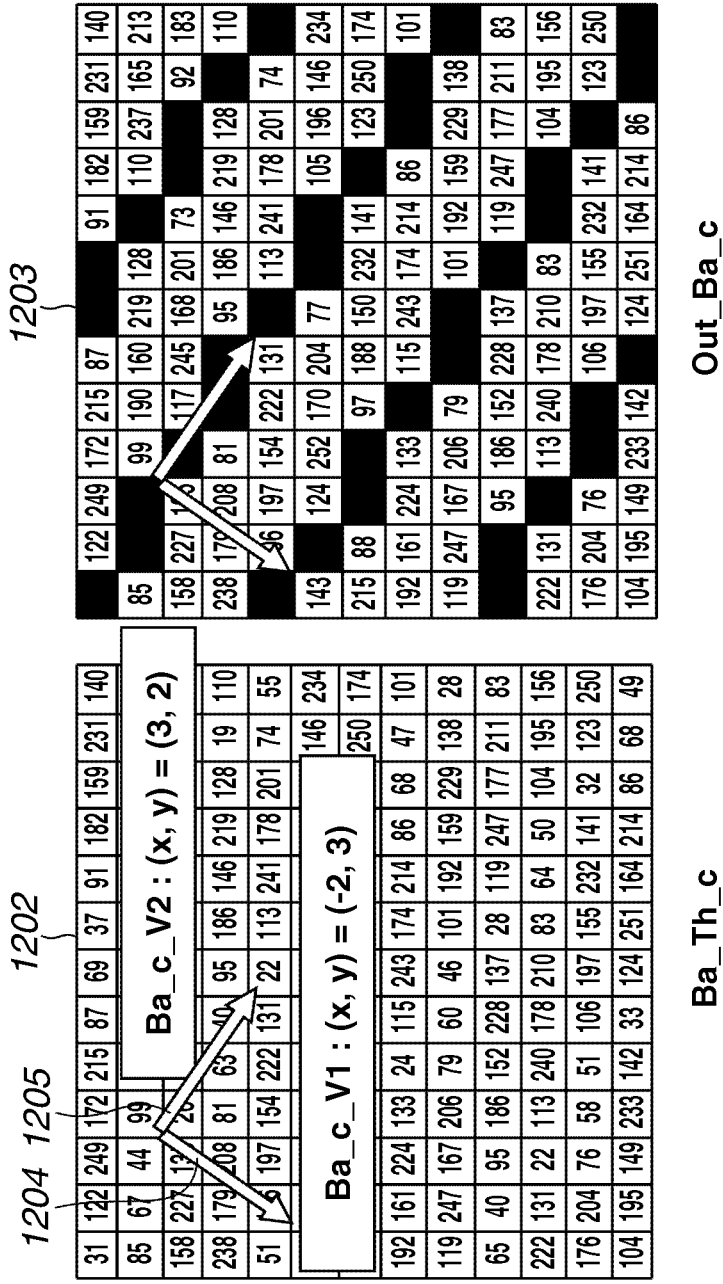

According to the second exemplary embodiment, line screen processing using line screen information 1201 illustrated in FIG. 12 is performed as basic screen processing. As described above, the line screen information 1201 includes as a line vector 1204, (x, y)=(−2, 3) which is perpendicular to the line direction.

According to the present exemplary embodiment, a screen vector 1205 (x, y)=(3, 2) whose starting point is the same as that of the screen vector 1204 and is parallel to the line direction is defined as the virtual screen vector. In other words, the screen vector 1204 and the virtual screen vector 1205 are perpendicular to each other.

Further, the length of the virtual screen vector 1205 is the same as that of the screen vector 1204. However, this is not a limitation. The virtual screen vector is thus defined as described above with respect to the line screen information 1201. The screen vector 1204 and the virtual screen vector 1205 are set as the basic screen vectors Ba_c_V1 and Ba_c_V2 respectively.

Furthermore, the line screen information used in performing basic screen processing of magenta includes a screen vector Ba_m_V1 (x, y)=(2, 3). The line screen information used in performing basic screen processing of yellow includes a screen vector Ba_y_V1 (x, y)=(−2, 2), and the line screen information used in performing basic screen processing of black includes a screen vector Ba_bk_V1 (x, y)=(0, 4).

Moreover, virtual screen vectors in parallel with the line direction for magenta, yellow, and black are respectively defined as Ba_m_V2 (x, y)=(−3, 2), Ba_y_V2 (x, y)=(2, 2), and Ba_bk_V2 (x, y)=(−4, 0). According to the present exemplary embodiment, the length of each of the virtual screen vectors Ba_m_V2, Ba_y_V2, and Ba_bk_V2 is the same as the length of Ba_m_V1, Ba_y_V1, and Ba_bk_V1 respectively. However, the lengths of the vectors are not limited to the above.

The line screen processing unit 107 performs two different types of line screen processing for each color with respect to the image data D_c, D_m, D_y, and D_bk.

The line screen information 304 of each color stores each line screen information, and includes the threshold values L_Th_c (k), L_Th_m(k), L_Th_y (k), and L_Th_bk (k) (wherein k is 1 or 2) respectively.

Figure 13A:
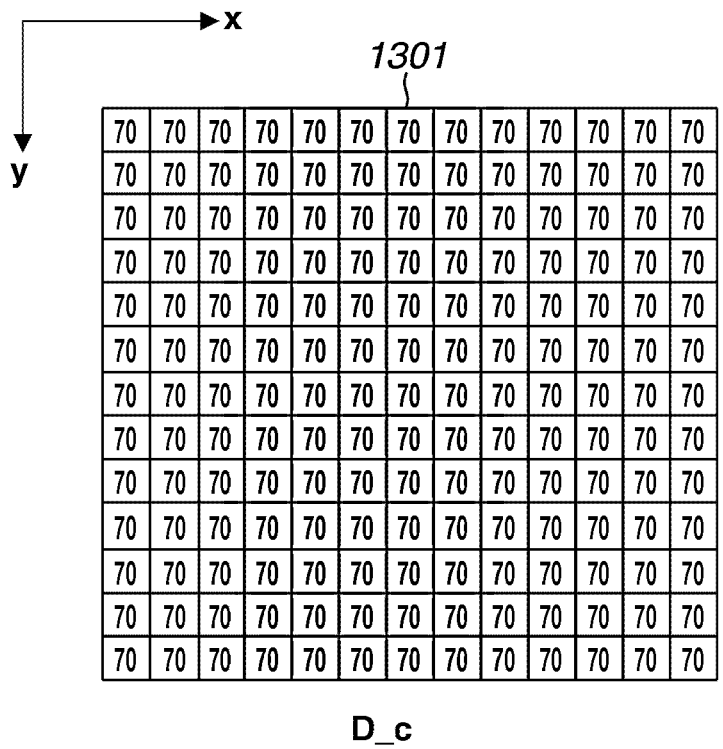
Figure 13B:
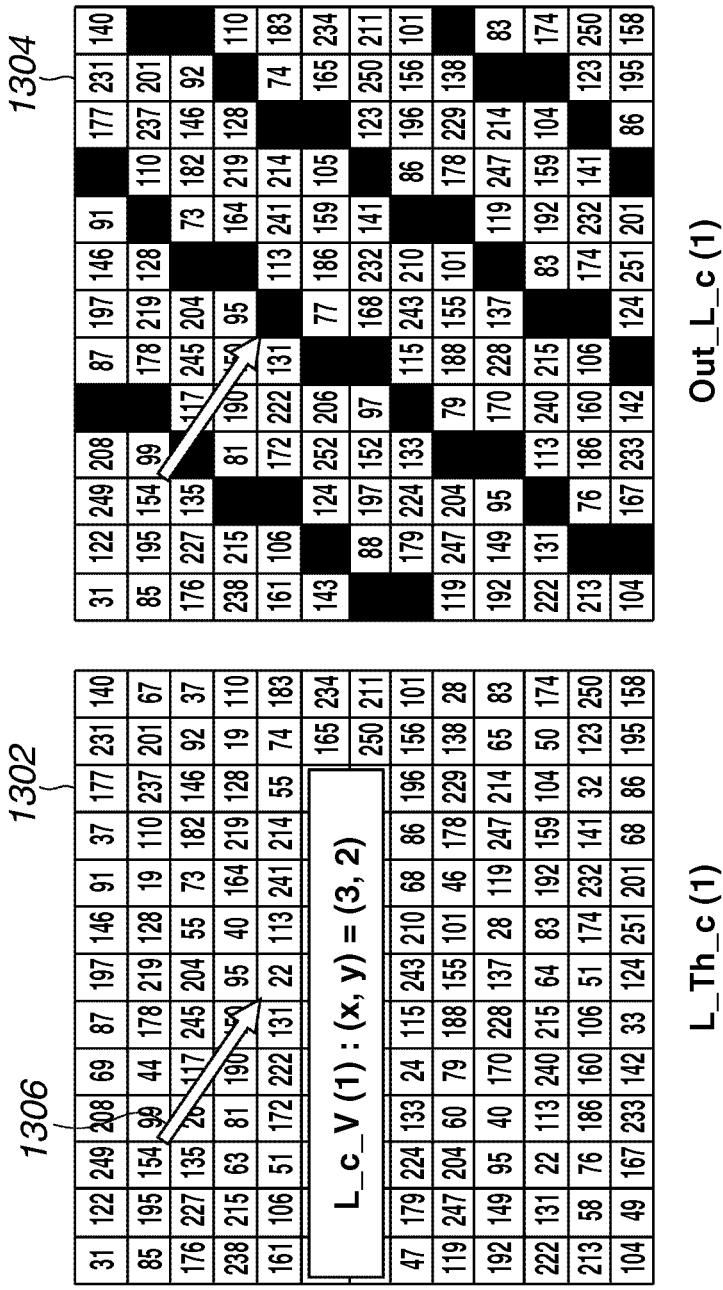
Figure 13C:
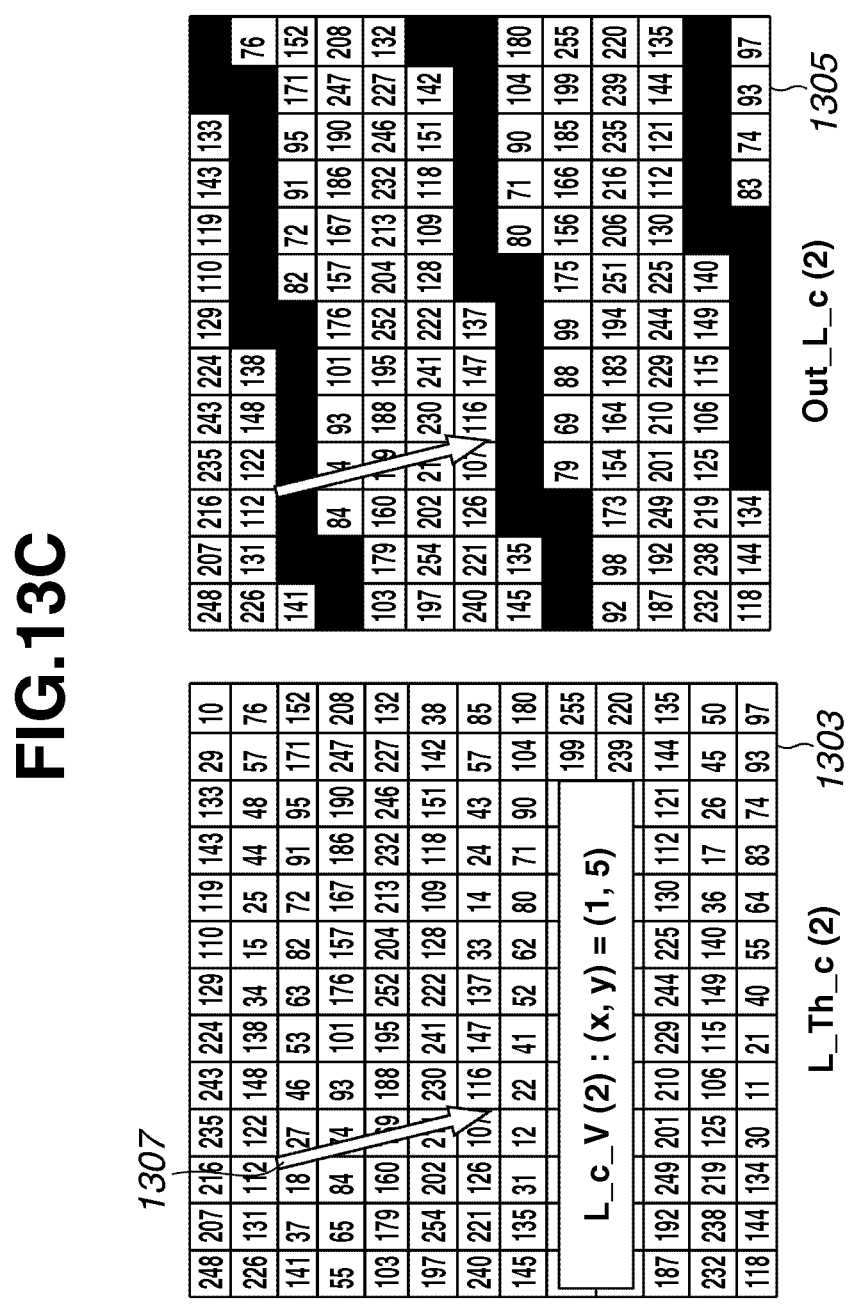

FIGS. 13A to 13C are schematic diagrams illustrating binarization (1304 and 1305) performed by the line screen processing unit 304 on cyan image data. Referring to FIG. 13A to 13C, a screen vector L_c_V(1) 1306 of the line screen information (1) is (x, y)=(3, 2), and a screen vector L_c_V(2) 1307 of the line screen information (2) is (x, y)=(1, 5). The starting points of the line screen vectors L_c_V(1) and L_c_V(2) are the same as the starting points of the basic screen vectors Ba_c_V1 and Ba_c_V2. The line screen vectors L_c_V(1) and L_c_V(2) satisfy equation (1). Each line screen vector is expressed as follows.

$$L\_c\_V(1) = 0 \times Ba\_c\_V1 + 1 \times Ba\_c\_V2 \quad (27)$$

($\alpha=0$, $\beta=1$)

$$L\_c\_V(2) = 1 \times Ba\_c\_V1 + 1 \times Ba\_c\_V2 \quad (28)$$

($\alpha=1$, $\beta=1$)

Two different types of line screen processing are similarly set for magenta, yellow, and black. According to the present exemplary embodiment, L_m_V(1)(x, y)=(−3, 2) and L_m_V(2)(x, y)=(−1, 5) are set for magenta. Further, L_y_V(1)(x, y)=(2, 2) and L_y_V(2)(x, y)=(0, 4) are set for yellow. Moreover, L_bk_V(1)(x, y)=(−4, 0) and L_bk_V(2) (x, y)=(−4, 4) are set for black.

The screen processing unit 105 then performs a plurality of screen processing for each color. Image processing including calculation of the evaluation value, selection of the line screen candidate, and generation of the combined screen information, is performed according to the flowchart illustrated in FIG. 2, similarly as in the first exemplary embodiment.

Figure 14:
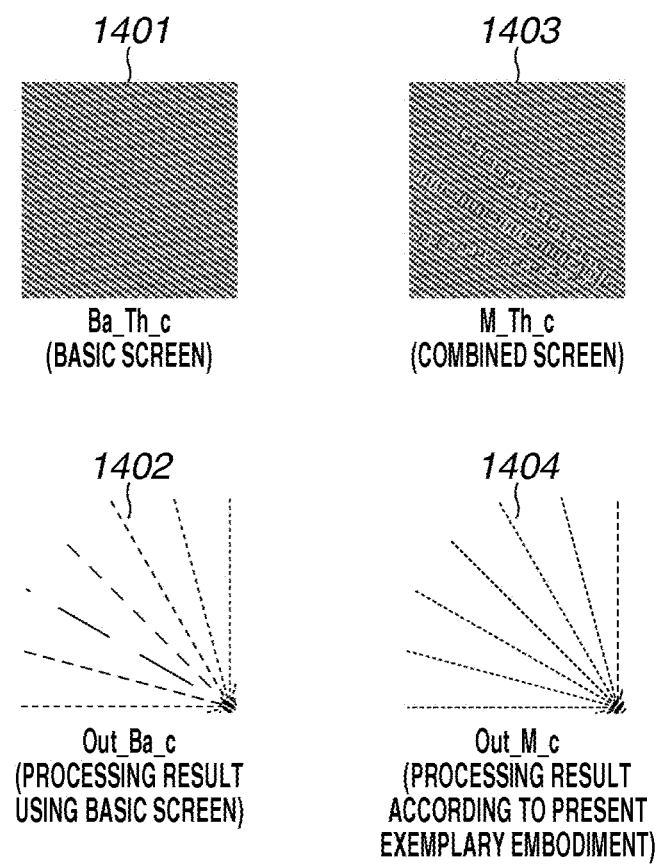
FIG. 14 illustrates an effect on the thin line image.
Figure 15:
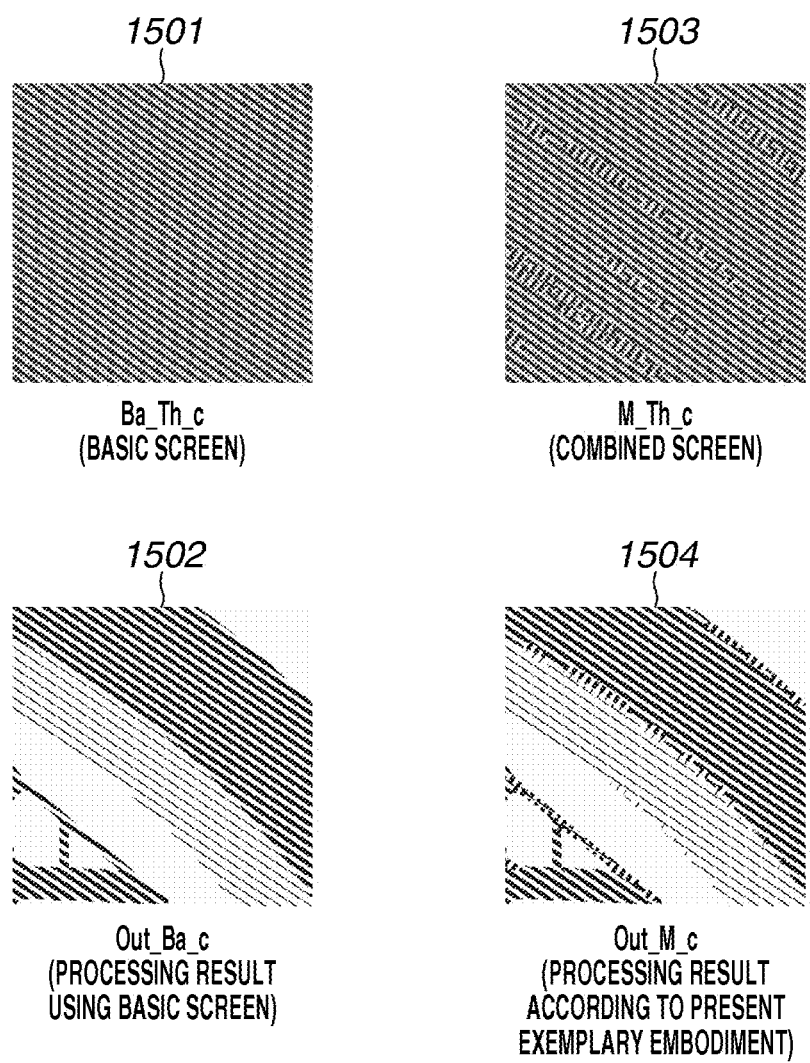
FIG. 15 illustrates an effect on the edge image.
Figure 16:
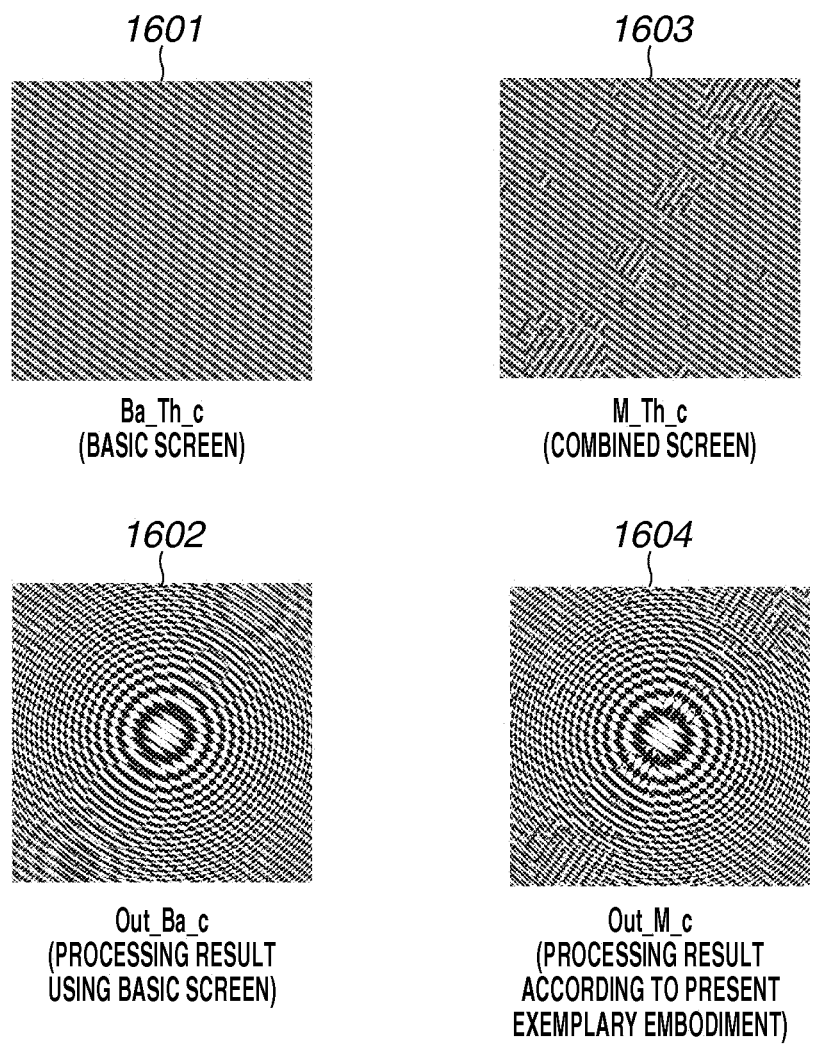
FIG. 16 illustrates an effect on the image in which various frequencies are included.

FIGS. 14, 15, and 16 illustrate the effects of the above-described process according to the second exemplary embodiment. FIG. 14 illustrates the processing result of the thin lines image, FIG. 15 illustrates the processing result of the edge image, and FIG. 16 illustrates the processing result of the image including various frequency components. In all of the images, appropriate binary data is output according to the present exemplary embodiment as compared to only performing basic screen processing.

According to the second exemplary embodiment, line screen processing is performed as basic screen processing. According to the present exemplary embodiment, two types of line screen processing other than basic screen processing, similar to the first exemplary embodiment, is described as an example.

According to the present invention, it is desirable for the screen processing unit 105 to perform at least two or more different types of line screen processing for one color. In other words, if dot screen processing is set as basic screen processing, the line screen processing unit 302 performs two different types of screen processing using two or more different line screen information tables 304 for each color.

Further, if line screen processing is performed as basic screen processing, the line screen processing unit 302 stores at least one or more line screen information 304 for each color.

However, the line screen processing unit may perform only one type of line screen processing. In particular, if the line screen vector is expressed as the linear combination of the basic screen vectors, and if linear coefficients are $\alpha=\beta$, a sufficient effect can be acquired.

As described above, if line screen processing is employed as the basic screen processing, the virtual screen vector which is parallel to the line direction is newly defined as the screen vector. As a result, a similar effect as in the first exemplary embodiment can be acquired even when line screen processing is employed as basic screen processing.

According to the above-described exemplary embodiments and modified example, the evaluation value is calculated for each pixel. However, this is not a limitation. According to a first modified example, the evaluation value calculation unit 106 according to the first exemplary embodiment is modified. More specifically, the evaluation value of each screen processing result is calculated in the halftone dot unit region of the dot screen information used in basic screen processing.

Figure 17:
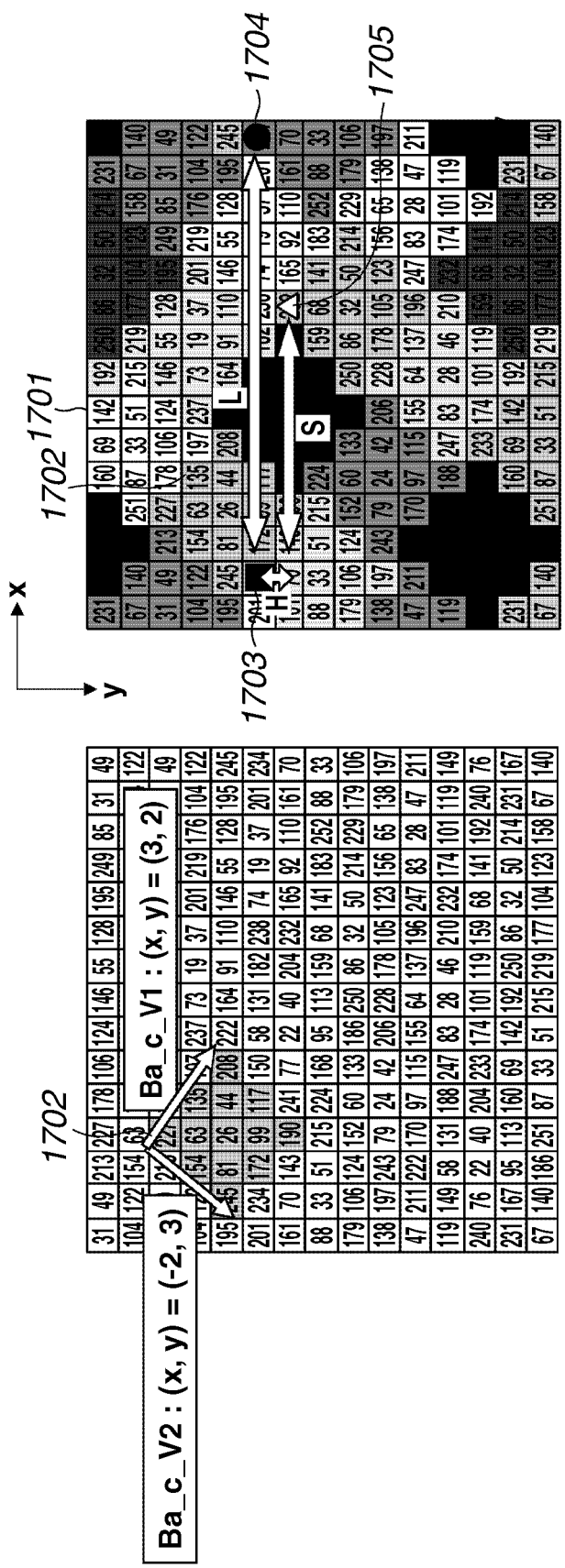
FIG. 17 illustrates a halftone dot unit region in dot screen information.

The halftone dot unit region is a parallelogram-shaped region surrounded by the basic screen vectors Ba_c_V1 and Ba_c_V2. Referring to FIG. 17, the halftone dot unit region is a region 1702 colored using the same color.

In each line screen processing, the evaluation value of each line screen processing result is calculated from a total sum of the absolute values of the evaluation values in a target halftone dot unit region. The reproducibility of each line screen processing result is then compared based on the evaluation value of the halftone dot unit region. Line screen processing which outputs the processing result having higher reproducibility is selected as the candidate, and the total sum of the evaluation values of the candidate line screen processing results is stored. More specifically, the process is expressed as equation (23-a).

$$\begin{aligned}
&\text{if}(\Sigma\{Abs(P\_L\_c(1))\} < \Sigma\{Abs(P\_L\_c(2))\} + q) \\
&\quad L\_SC\_flg = 1 \\
&\quad L\_SC\_Abs = \Sigma\{Abs(P\_L\_c(1))\} \\
&\}\text{else}\{ \\
&\quad L\_SC\_flg = 2 \\
&\quad L\_SC\_Abs = \Sigma\{Abs(P\_L\_c(2))\} \\
&\}
\end{aligned} \quad (23\text{-a})$$

As described above, if q is a positive value, line screen processing (1) is preferentially selected. If q is a negative value, line screen processing (2) is preferentially selected.

In equation (23-a), "Σ" indicates acquisition of the sum of the absolute values of the evaluation values of each pixel included in the halftone dot unit region. For example, Σ{Abs (P_L_c(1))} indicates the evaluation value of line screen processing (1) in a basic screen halftone dot unit region, and Σ{Abs(P_L_c(2))} indicates the evaluation value of the line screen processing (2) in the basic screen halftone dot unit region.

The total sum of the absolute values of the evaluation values in the target halftone dot unit region is also calculated for the dot screen processing result and is set as the evaluation value.

$$Ba\_SC\_Abs = \Sigma\{Abs(P\_Ba\_c)\} \quad (24\text{-}a)$$

The combined screen information is then generated according to the parameter calculation table similarly as in the first exemplary embodiment.

When calculating x-y coordinates of the halftone dot region, it is effective to use Holladay algorithm. The Holladay algorithm indicates, when the screen vectors Ba_c_V1 and Ba_c_V2 are provided, a number of pixels Nh of halftone dots for paving the halftone dots region without any overlap, and relative coordinate positions H, L, and S of the halftone dots.

More specifically, L indicates a relative position in the x direction in which the same halftone dot is provided on the same y coordinate as the starting point. S indicates a relative position in the x direction in which the same halftone dot is provided H lines below (y+H coordinate). If Ba_c_V1 (x1, y1)=(3, 2) and Ba_c_V2(x2, y2)=(−2, 3), Nh, H, L, and S can be calculated as follows using the Holladay algorithm.

$$Nh = x1 \cdot y2 - y1 \cdot x2 = 13$$

$$H = GCD(y1, y2) = 1$$

$$L = Nh/H = 13$$

$$S = 8$$

Details on the above calculation are described in "Digital Color Halftoning", Henry R. Kang, IEEE Press/SPIE Press, P. 231-233. Since Holladay algorithm is a known technique, details will be omitted.

If the position of a reference halftone dot is a black square ■ (1703) illustrated in FIG. 17, a black circle ● (1704) is relatively shifted by (0, L) coordinates with respect to the black square ■. In other words, the same halftone dot is formed at L=13 from the reference halftone dot on the same y coordinate.

On the other hand, a triangle Δ (1705) is relatively shifted by (H, S) coordinates from the black square ■. In other words, the same halftone dot is formed H lines below and S=8 away from the reference halftone dot. As a result, repeating coordinates of the halftone dots on the same y coordinate or below H lines can be effectively acquired.

Further, according to the above-described example, the evaluation value in the halftone dot unit region is calculated. However, the evaluation value may be calculated in an integral fraction of the halftone dots unit, or an integral multiple of the halftone dots unit of the basic screen. In such a case, the evaluation value can be easily calculated using the integral fraction or the integral multiple of the coordinates of the halftone dot calculated employing the Holladay algorithm.

According to the above-described exemplary embodiment, cyan is described as an example. However, the evaluation value can be calculated in halftone dot unit similarly for magenta, yellow, and black.

As described above, the reproducibility of each screen processing result is compared for each halftone dot unit region instead of for each pixel, and the screen is combined for each halftone dot unit region. A high quality image with respect to granularity can thus be acquired.

A second modified example illustrates a modification of combined screen information generation. According to the first and second exemplary embodiments, the parameter calculation table illustrated in FIG. 7 is used. There is also a parameter calculation table as illustrated in FIG. 18.

According to the table illustrated in FIG. 7, if the evaluation value Ba_SC_Abs of the basic screen processing result is greater than or equal to a predetermined value, line screen processing is applied regardless of the evaluation value of the line screen processing result.

On the contrary, according to the parameter calculation table illustrated in FIG. 18, the parameters are set by considering the evaluation value of the line screen processing result in addition to the evaluation value of the basic screen processing result. If both of the evaluation values of the basic screen processing result and the line screen processing result are unsatisfactory, the threshold value of the basic screen processing is set. As a result, it prevents excessive switching of the screen and loss of stability of the image.

If either of the parameters W_Ba and W_L is 0, it becomes the same as selecting either the threshold value of basic screen processing or of line screen processing. In other words, if there is a pixel or a region in which one of the threshold values of a plurality of screens is directly used as the threshold value, the previously acquired processing result may be directly output instead of re-performing screen processing.

Further, the parameter calculation tables illustrated in FIGS. 7 and 18 are 7-by-7 two-dimensional square arrays. However, this is not a limitation, and the parameter calculation table may be less than or greater than 7-by-7 or 8-by-8. Furthermore, the parameter calculation table may be a rectangular array, such as 7-by-3 or 3-by-1.

Moreover, the parameter calculation table is not limited to be two-dimensional and may be three-dimensional. Further, the parameter calculation tables illustrated in FIGS. 7 and 18 are examples indicating three states in which the values of the parameters are 1.0. 0.5, and 0. However, the values of the parameters may be other real number values. For example, 0.1, 0.2, 0.8, and 0.9 may be stored instead of 0.5.

Furthermore, according to the first and second exemplary embodiments, the combined screen information calculation unit 108 acquires the combined screen information by linear combination of the basic screen and line screen information as illustrated in equation (26). However, the present invention is not limited to the above, as long as a rule describe below is satisfied: Basic screen processing is applied to the region that is not the thin lines portion or the edge portion, line screen processing is applied to the thin lines portion and the edge portion, and processing which is an intermediate of basic screen processing and line processing is applied to an intermediate of the thin lines portion and the edge portion.

For example, element values which have been weighted according to the parameters corresponding to each screen processing are calculated. The element values are then compared, and the smaller element value is selected. In such a case, equation (26) may be expressed as equation (26-b) described below.

```
IF(W_Ba > 0.5){
  y_B = 1.0
  y_L = 1.0 − 2.0 × (W_Ba − 0.5)
  T_B = y_B × Ba_Th_c / 255.0
```

-continued

Figure 19:
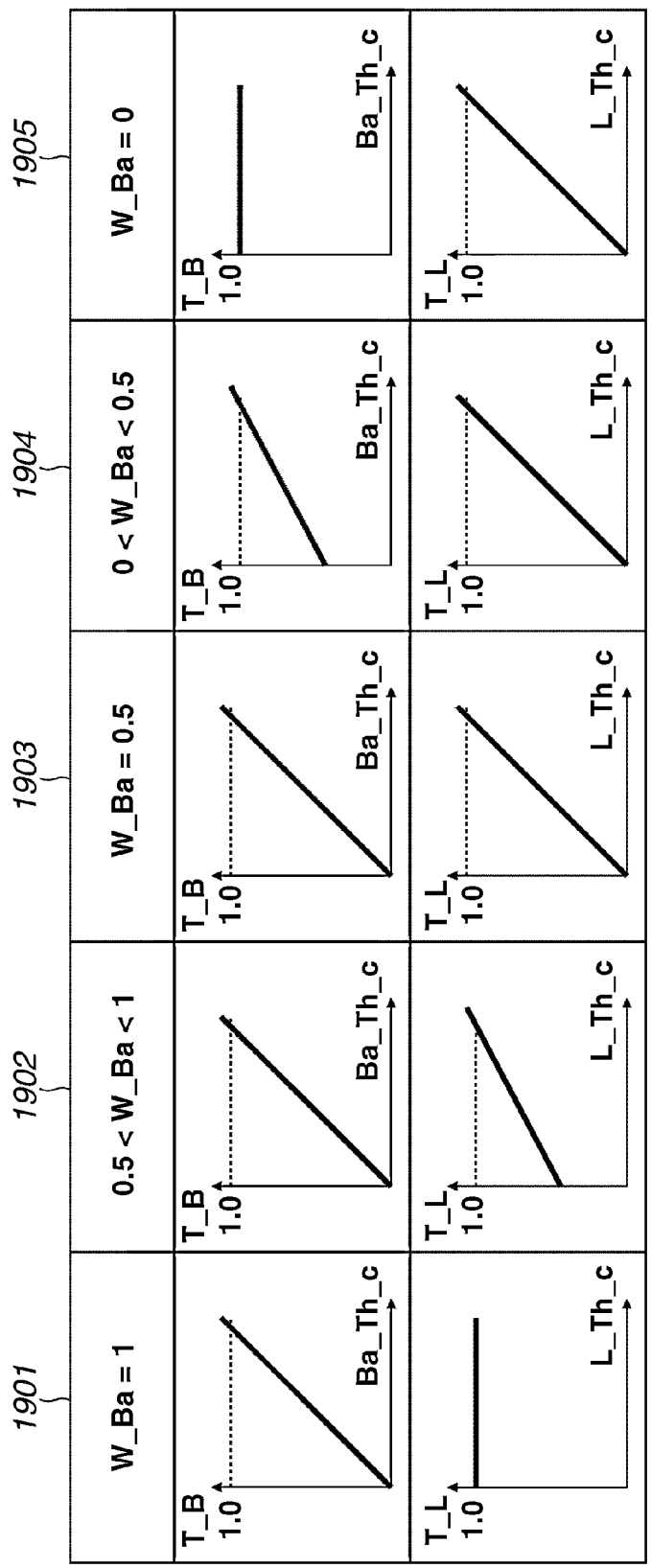
FIG. 19 illustrates an operation of a combined screen information calculation unit when screen processing is combined by comparing element values.

```
T_L = y_L × L_Th(L_SC_flg) / 255.0 + 2.0 × (W_Ba – 0.5)
}else{
y_B = 2.0 × W_Ba
y_L = 1.0
T_B = y_B × Ba_Th / 255.0 + 1.0 – W_Ba × 2.0
T_L = y_L × L_Th(L_SC_flg) / 255.0
}                                                              (26-a)
``` wherein $1 \leq Ba\_Th \leq 255$ and $1 \leq L\_Th(L\_SC\_flg) \leq 255$. The above-described equation (26-a) indicates that the element values T_B and T_L change according to the value of W_Ba. FIG. 19 illustrates how the element values T_B and T_L change according to equation (26-a). The threshold values are then acquired according to the calculated element values T_B and T_L.

```
IF(T_B > T_L){
  M_Th = T_L × 255.0 × g_t(W_Ba)
}else{
  M_Th = T_B × 255.0 × g_t(W_Ba)
}                                                              (26-b)
```

In the above-described equation, g_t(W_Ba) is a gain value that changes according to the combination ratio W_Ba. Since the number of dots to be output may not be maintained, it is preferable to previously set the gain value g_t(W_Ba) to change according to the combination ratio so that the number of dots to be output is maintained for any combination ratio.

Further, the combined screen information may be calculated by multiplying basic screen processing and line screen processing. The case where the combined screen information is generated by multiplying the above-described element values is described below. In such a case, equation (26) becomes as indicated in equation (26-e).

```
IF(W_Ba > 0.5){
y_B = 1.0
y_L = 1.0 – 2.0 × (W_Ba – 0.5)
T_B = y_B × Ba_Th / 255.0
T_L = y_L × L_Th(L_SC_flg) / 255.0 + 2.0 × (W_Ba – 0.5)
g_B = 0.5
g_L = W_Ba
}else{
y_B = 2.0 × W_Ba
y_L = 1.0
T_B = y_B × Ba_Th / 255.0 + 1.0 – W_Ba × 2.0
T_L = y_L × L_Th(L_SC_flg) / 255.0
g_B = 1.0 – W_Ba
g_L = 0.5
}                                                              (26-c)
``` wherein $1 \leq Ba\_Th \leq 255$ and $1 \leq L\_Th(L\_SC\_flg) \leq 255$.

$$g\_t = 0.5/(g\_B \times g\_L) \quad (26\text{-}d)$$

$$M\_Th = T\_B \times T\_L \times g\_t \times 255.0 \quad (26\text{-}e)$$

The above-described equations (26-c) and (26-d) indicate that the element values T_B and T_L and g_t change according to the value of W_Ba. FIG. 20 illustrates how the values T_B, T_L, and g_t change according to equations (26-c) and (26-d).

In the above-described equation, g_t is a gain value for maintaining the number of dots to be output for any combination ratio. In other words, g_t causes an average value of the combined screen information to be constant and thus maintains the number of dots to be output.

If the combined screen information is generated by simply multiplying the basic screen information and the line screen information, the average value of the combined screen information may not be maintained. For example, when W_Ba=1 (2001), T_L always becomes 1.0. However, when W_Ba=1 (2003), T_L on the average becomes 0.5. To solve such a problem, when W_Ba=0.5, a gain g_t=2.0 is multiplied, so that the average value of the combined screen information becomes constant. The calculation of g_t is not limited to the above and may change according to the combination ratio W_Ba.

According to the above-described exemplary embodiments and modified examples, the basic screen information and the line information each store the threshold value groups including the threshold values corresponding to each pixel position. However, the threshold value group may be calculated in real time instead of being stored. The threshold value group can be calculated in real time by storing the screen vector information in the basic screen information 303 and the line screen information 304 illustrated in FIG. 3.

Further, according to the above-described exemplary embodiments and modified examples, the combined screen information calculation unit 108 illustrated in FIG. 1 sets the parameters according to the evaluation value of each screen processing result, and calculates the combined screen information for each case. However, previously combined screen processing may be prepared, and screen processing may be switched according to the evaluation value.

More specifically, intermediate screen information which is acquired by combining the basic screen information and the line screen information is prepared in addition to the basic screen information and the line screen information. One of the basic screen information, the line screen information, and the intermediate screen information is then selected according to the evaluation value of each screen processing result. In such a method, it is not necessary to generate the combine screen information each time the evaluation value calculation unit 106 outputs the evaluation value.

According to the above-described exemplary embodiment, there are a number of methods for setting the screen vector that is referred to in performing line screen processing. However, the present invention is not limited to the above, and any method may be performed as long as screen processing using the screen vector satisfying equation (1) is performed. For example, there are other line vectors as follows.

$$L\_c\_V = 1/2 \times Ba\_c\_V1 + 1/2 \times Ba\_c\_V2 \quad (29)$$

($\alpha = 1/2$, $\beta = 1/2$)

$$L\_c\_V = 1 \times Ba\_c\_V1 + 1 \times Ba\_c\_V2 \quad (30)$$

($\alpha = 1$, $\beta = 1$)

As indicated in equation (29), attention is necessary when the combination coefficient is an inverse of an integer, i.e., a decimal number. In such a case, the screen vector cannot be set on a simple digital lattice. If the line screen vector is a decimal number, a screen including super cells frequently used in a print screen is used. Since a screen including super cells is known, details will be omitted.

According to the above-described exemplary embodiments and modified examples, when the parameters for generating the combined screen are to be determined, the evaluation values are calculated for all screen processing results. However, this is not a limitation, and as illustrated in FIG. 21, the parameters for generating the combined screen may be determined by calculating the evaluation value of only the basic screen processing result.

More specifically, the LPF performs filtering processing on the binary data acquired by performing basic screen processing as described above, and the evaluation result of the basic screen processing result is calculated. If the evaluation value of the basic screen processing result exceeds a predetermined value, the line screen processing is employed. Further, if the evaluation value is close to the predetermined value, screen processing is performed by referring to the intermediate screen information which is an intermediate of the basic screen information and the line screen information.

According to the above-described exemplary embodiments and modified examples, it is necessary to perform LPF processing on the input image data and LPF processing on the binary data after performing screen processing to calculate the evaluation value. However, it is not always necessary to perform LPF processing twice. For example, FIG. 22 illustrates an example of a configuration for calculating the evaluation value by performing LPF processing once. Referring to FIG. 22, the evaluation value calculation unit 106 subtracts the binary data acquired by performing screen processing from the input image data, and then performs filtering processing using the LPF. In such a case, the evaluation value can be calculated similarly as in the first and second exemplary embodiments.

Further, according to the above-described exemplary embodiments, the evaluation value calculation unit 106 calculates the evaluation value by actually performing screen processing and calculating the difference between the input image data. However, it is not always necessary to actually perform screen processing to calculate the evaluation value.

FIG. 23 illustrates an example of a pseudo-screen processing method for calculating data approximate to the screen-processed binary data without actually performing screen processing. Referring to FIG. 23, an example 2301 indicates a case where screen processing is actually performed, and an example 2302 indicates a case where pseudo-screen processing is performed.

When performing pseudo-screen processing, a product of sign-inverse data of 1 and −1 having the same frequency as the actual screen frequency, and the image data, is calculated. As a result, the frequency can be modulated to the frequency after actually performing screen processing. Further, signals whose average is 0 can be acquired from the output data illustrated in the example 2302. According to the above-described method, the pseudo-calculation of the evaluation value can be performed without actually performing screen processing.

FIG. 24 illustrates an example of performing pseudo-screen processing according to the present invention. Referring to FIG. 24, an evaluation value which is approximately equal (i.e., with a small difference) to the actual screen processing result can be acquired. In the configuration illustrated in FIG. 24, a basic pseudo-screen processing unit 306 executes the pseudo-screen processing illustrated in FIG. 23 by using the pseudo-screen instead of the basic screen (dot screen) described above in the first exemplary embodiment. In addition, a pseudo line screen processing unit 307 executes the pseudo-screen processing illustrated in FIG. 23 by using the pseudo line screen instead of the line screen described above in the first exemplary embodiment. The basic pseudo-screen processing unit 306 has sign changing data having values "1" and "−1" with the same frequency as the dot screen used in the basic screen processing unit 301 illustrated in the first exemplary embodiment, and multiplies the input image data by the sign changing data. Thus, the evaluation value, in a case where the processing is performed by using the basic screen, can be calculated in a pseudo manner. Similarly, the basic pseudo line screen processing unit 307 has sign changing data having values "1" and "−1" with the same frequency as the line screen used in the line screen processing unit 302 illustrated in the first exemplary embodiment, and multiplies the input image data by the sign changing data. Thus, the evaluation value, in a case where the screen processing is performed by using the line screen, can be calculated in a pseudo manner.

In this case, both of sign changing data respectively included in basic pseudo-screen processing unit 306 and the pseudo line screen processing unit 307 are set to be zero on an average, which can cause the evaluation value to be obtained by multiplication with the input image data as illustrated in FIG. 23, to be zero on an average. Further, according to the configuration example illustrated in FIG. 24, since the average of the pseudo-screen processing data becomes 0, it is not necessary to calculate the difference between the input image data. According to the above-described configuration, an approximate value of the difference between the low-frequency component of the input image data and the low-frequency component of the screen processing result can be acquired using a small number of LPFs and without actually calculating the difference between the input image data. The evaluation value can thus be calculated.

According to the above-described exemplary embodiments, screen processing is performed in which binary data is output. However, the present invention may be applied to screen processing that outputs multi-valued data.

The present invention may be realized as a system, an apparatus, a method, a program, or a storage medium (i.e., a recording medium). Further, the present invention may be applied to a system including a plurality of devices (e.g., a host computer, an interface device, an imaging apparatus, and a web application), or may be applied to an apparatus including a single device.

The present invention may also be realized by directly or remotely supplying to a system or an apparatus, software or a program, and a computer of the system or the apparatus reading the supplied program. In such a case, the program realizes the functions described in the present invention.

According to the above-described exemplary embodiments and modified examples, the evaluation values are calculated for all pixels in the image data by assuming that no attribute data of non thin line portion and non edge portion, and the thin lines and the edge regions, are not previously given. The screen combination parameters are then calculated based on the evaluation values. However, if image characteristics are previously acquired based on the attribute data and region determination information, screen processing according to the present exemplary embodiment may be performed based on the image characteristics.

For example, if there is the attribute data of the thin line portion or the edge portion, the evaluation values are calculated only for the attribute data region. The screen combination parameters are then calculated according to the evaluation values, and processing employing the combined screen may be performed.

Further, a method may be employed in which screen processing according to the present exemplary embodiment is not performed on a specific region. For example, if the region determination information can be acquired for a person region, a face region, or a region in which there is a large amount of noise, screen processing using the combined screen according to the above-described exemplary embodiment is not performed only on such a region.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-168540 filed Jul. 27, 2010, which is hereby incorporated by reference herein in its entirety.

What is claimed is:

1. An image processing apparatus comprising:
a first screen processing unit configured to perform screen processing on input image data using first screen information;
an evaluation unit configured to acquire an evaluation value of a processing result of the first screen processing unit based on a difference between a low-frequency component of the processing result of the first screen processing unit and a low-frequency component of the input image data;
a setting unit configured to set screen information acquired by performing calculation using the first screen information and second screen information that is different from the first screen information, according to an the evaluation value of a processing result of the first screen processing unit; and
a second screen processing unit configured to perform screen processing on the input image data using the set screen information.

2. The image processing apparatus according to claim 1, wherein the setting unit is capable of selectively setting the first screen information and the calculated screen information.

3. The image processing apparatus according to claim 1, wherein the setting unit is capable of selectively setting the first screen information, the second screen information, and the calculated screen information.

4. The image processing apparatus according to claim 1, further comprising a third screen processing unit configured to perform screen processing using the second screen information,
wherein the evaluation unit further acquires an evaluation value of a processing result of the third screen processing unit based on a low-frequency component of the processing result of the third screen processing unit and a low-frequency component of the input image data, and
wherein the setting unit calculates the first screen information and the second screen information according to an evaluation value of a processing result of the first screen processing unit and an evaluation value of a processing result of the third screen processing unit.

5. The image processing apparatus according to claim 4, wherein the setting unit sets, if an evaluation value of a processing result of the first screen processing unit and an evaluation value of a processing result of the third screen processing unit are both unsatisfactory, the first screen information.

6. The image processing apparatus according to claim 1, wherein the first screen information is dot screen information, and the second screen information is line screen information.

7. The image processing apparatus according to claim 1, wherein the second screen information is line screen information, and a screen vector acquired from the line screen information is indicated by linear combination of two screen vectors configuring the first screen processing, and each combination coefficient is an integer or an inverse of an integer.

8. The image processing apparatus according to claim 1, wherein the second screen information includes a plurality of different types of line screen information.

9. The image processing apparatus according to claim 1, wherein the evaluation unit uses a low pass filter which cuts off frequencies according to screen processing performed by the first screen processing unit.

10. The image processing apparatus according to claim 1, wherein the difference between a low-frequency component of a processing result of the first screen processing unit and a low-frequency component of the input image data is acquired by calculating a difference between a processing result of the first screen processing unit and the input image data and acquiring a low-frequency component of the difference.

11. An image processing apparatus according to claim 1 wherein the screen processing is dithering processing using a screen.

12. An image processing method comprising:
performing first screen processing on input image data using first screen information;
acquiring an evaluation value of a processing result of performing the first screen processing based on a difference between a low-frequency component of the processing result of the first screen processing unit and a low-frequency component of the input image data;
setting screen information acquired by performing calculation using the first screen information and second screen information that is different from the first screen information, according to the evaluation value of a processing result of performing the first screen processing; and
performing second screen processing on the input image data using the set screen information.

13. A non-transitory computer-readable storage medium containing computer-executable program code for performing an image processing method comprising:
performing first screen processing on input image data using first screen information;
acquiring an evaluation value of a processing result of performing the first screen processing based on a difference between a low-frequency component of the processing result of the first screen processing unit and a low-frequency component of the input image data;
setting screen information acquired by performing calculation using the first screen information and second screen information that is different from the first screen information, according to the evaluation value of a processing result of performing the first screen processing; and
performing second screen processing on the input image data using the set screen information.

* * * * *